(12) United States Patent
Curley et al.

(10) Patent No.: US 10,807,003 B2
(45) Date of Patent: Oct. 20, 2020

(54) SYSTEMS AND METHODS FOR DETERMINING DISTANCES REQUIRED TO ACHIEVE A LINE OF SITE BETWEEN NODES

(71) Applicant: Activision Publishing, Inc., Santa Monica, CA (US)

(72) Inventors: Jeffrey C. Curley, Studio City, CA (US); Paul Kerby, Sherman Oaks, CA (US); Calvin Lin, Los Angeles, CA (US); Edward Alexander Hampton, Lake Balboa, CA (US); Paul R. Haile, Los Angeles, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 16/254,365

(22) Filed: Jan. 22, 2019

(65) Prior Publication Data

US 2019/0224569 A1 Jul. 25, 2019

Related U.S. Application Data

(63) Continuation of application No. 15/142,468, filed on Apr. 29, 2016, now Pat. No. 10,226,701.

(51) Int. Cl.
*A63F 13/60* (2014.01)
*A63F 13/573* (2014.01)
*A63F 13/493* (2014.01)

(52) U.S. Cl.
CPC ............ *A63F 13/60* (2014.09); *A63F 13/493* (2014.09); *A63F 13/573* (2014.09)

(58) Field of Classification Search
None
See application file for complete search history.

(56) References Cited

U.S. PATENT DOCUMENTS

| 5,530,796 | A | 6/1996 | Wang |
| 5,561,736 | A | 10/1996 | Moore |
| 5,563,946 | A | 10/1996 | Cooper |
| 5,685,775 | A | 11/1997 | Bakoglu |
| 5,706,507 | A | 1/1998 | Schloss |
| 5,708,764 | A | 1/1998 | Borrel |

(Continued)

FOREIGN PATENT DOCUMENTS

| AU | 768367 | 3/2004 |
| AU | 2005215048 | 10/2011 |

(Continued)

*Primary Examiner* — Robert T Clarke, Jr.
(74) *Attorney, Agent, or Firm* — Novel IP

(57) ABSTRACT

Disclosed is a system and method of generating, for a given game map, an LOS catalog before gameplay and identifying a spawn location during gameplay based on the LOS catalog. For every unique pair of map nodes in a game map, the LOS catalog may indicate the minimum distance that must be traveled from a first map node of the pair to achieve LOS to a second map node of the pair, an identifier for the first map node, and an identifier for the second map node. When a gameplay session is initiated, the LOS catalog may be retrieved and used to identify relatively safe spawn points based on distances that must be traveled from enemy positions to achieve LOS to potential spawn points.

20 Claims, 12 Drawing Sheets

(56) References Cited

U.S. PATENT DOCUMENTS

| | | |
|---|---|---|
| 5,736,985 A | 4/1998 | Lection |
| 5,737,416 A | 4/1998 | Cooper |
| 5,745,678 A | 4/1998 | Herzberg |
| 5,768,511 A | 6/1998 | Galvin |
| 5,825,877 A | 10/1998 | Dan |
| 5,835,692 A | 11/1998 | Cragun |
| 5,878,233 A | 3/1999 | Schloss |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,923,324 A | 7/1999 | Berry |
| 5,969,724 A | 10/1999 | Berry |
| 5,977,979 A | 11/1999 | Clough |
| 5,990,888 A | 11/1999 | Blades |
| 6,014,145 A | 1/2000 | Bardon |
| 6,025,839 A | 2/2000 | Schell |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,311,206 B1 | 10/2001 | Malkin |
| 6,334,141 B1 | 12/2001 | Varma |
| 6,336,134 B1 | 1/2002 | Varma |
| 6,337,700 B1 | 1/2002 | Kinoe |
| 6,353,449 B1 | 3/2002 | Gregg |
| 6,356,297 B1 | 3/2002 | Cheng |
| 6,411,312 B1 | 6/2002 | Sheppard |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,469,712 B1 | 10/2002 | Hilpert, Jr. |
| 6,473,085 B1 | 10/2002 | Brock |
| 6,499,053 B1 | 12/2002 | Marquette |
| 6,505,208 B1 | 1/2003 | Kanevsky |
| 6,525,731 B1 | 2/2003 | Suits |
| 6,549,933 B1 | 4/2003 | Barrett |
| 6,567,109 B1 | 5/2003 | Todd |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,765,596 B2 | 7/2004 | Lection |
| 6,781,607 B1 | 8/2004 | Benham |
| 6,819,669 B2 | 11/2004 | Rooney |
| 6,832,239 B1 | 12/2004 | Kraft |
| 6,836,480 B2 | 12/2004 | Basso |
| 6,886,026 B1 | 4/2005 | Hanson |
| 6,948,168 B1 | 9/2005 | Kuprionas |
| RE38,865 E | 11/2005 | Dumarot |
| 6,993,596 B2 | 1/2006 | Hinton |
| 7,028,296 B2 | 4/2006 | Irfan |
| 7,062,533 B2 | 6/2006 | Brown |
| 7,143,409 B2 | 11/2006 | Herrero |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |

(56) References Cited

U.S. PATENT DOCUMENTS

| | | |
|---|---|---|
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,706,298 B2 | 4/2014 | Goulding |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 9,904,982 B2 * | 2/2018 | Suzuki ................ G06T 3/4038 |
| 2004/0143852 A1 * | 7/2004 | Meyers ................ A63F 13/12 |
| | | 725/133 |
| 2006/0040239 A1 | 2/2006 | Cummins |
| 2007/0198178 A1 * | 8/2007 | Trimby ................ G06N 5/003 |
| | | 701/533 |
| 2008/0026838 A1 * | 1/2008 | Dunstan ................ A63F 13/00 |
| | | 463/30 |
| 2008/0235320 A1 | 9/2008 | Joy |
| 2009/0113448 A1 | 4/2009 | Smith |
| 2014/0344725 A1 | 11/2014 | Bates |
| 2015/0050996 A1 | 2/2015 | Kharkar |
| 2016/0191671 A1 | 6/2016 | Dawson |
| 2016/0332074 A1 | 11/2016 | Marr |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |

(56) References Cited

FOREIGN PATENT DOCUMENTS

| | | |
|---|---|---|
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

* cited by examiner

SYSTEMS AND METHODS FOR DETERMINING DISTANCES REQUIRED TO ACHIEVE A LINE OF SITE BETWEEN NODES

CROSS-REFERENCE TO RELATED APPLICATIONS

The present application is a continuation application of U.S. patent application Ser. No. 15/142,468, entitled "System and Method for Identifying Spawn Locations in a Video Game" and filed on Apr. 29, 2016, which is hereby incorporated herein by reference in its entirety.

FIELD OF THE INVENTION

The invention relates generally to video games, and more particularly to a system and method for generating, for a given game map, a line of site ("LOS") catalog of minimum distances to travel to achieve line of site to potential spawn locations, and identifying a spawn location during gameplay based on the LOS catalog.

BACKGROUND OF THE INVENTION

In most video games, players typically control a character (e.g., an athlete, soldier, "rock-star," superhero, monster, animal, imaginary creature or beast, etc.) or object (e.g., race car, spaceship, etc.) to perform various game actions in order to accomplish a game event.

In many multiplayer (and other) video games, players are often placed (or created) at a given location in a game map at the start of a gameplay session, or new level or round, etc. This process is known as "spawning." "Respawning" is the replacement (or recreation) of a player at a given location in a game map during gameplay after he, she (or it) has been killed, destroyed, or otherwise removed from gameplay for a predetermined time period. Respawning is common in video games where a player may have multiple lives, such as in first-person shooter video games including, for example, the "Call of Duty®" video game franchise published by Activision Publishing, Inc. The locations in a game map at which players are spawned and/or respawned are known as "spawn locations" or "spawn points."

Typically, potential spawn (and respawn) locations for a game map may be determined by video game designers. During game play, a computer system (e.g., a game server) that hosts a video game often determines an appropriate spawn location from among potential spawn locations for a player. Most players have an expectation that they will not be re-spawned during gameplay at a spawn location that puts them in immediate danger or harm's way. Otherwise, a player may be killed as she is re-spawned, or forced to engage opponents much more quickly than desired, leading to unsatisfactory gameplay. Indeed, the practice of "spawn camping," or lying in wait at or near a spawn location in order to engage and/or kill opponents as they are being respawned, can be considered (depending on the game) poor sportsmanship.

Conventional attempts at identifying safe spawn locations at which to re-spawn players include direct line of sight computations from an enemy position and a spawn location to determine whether or not the spawn location is safe. However, such runtime computations can be computationally expensive because they typically involve issuing line of sight traces between a player position and the spawn location through the map geometry. Because of this computational burden, some computer systems may attempt to cache the most current information possible without simultaneously running multiple line of site calculations by performing a line of site computation each server frame, even if no spawn requests were made for that server frame. This can lead to outdated line of site information and slow down game processes (or prevent other game processes that could otherwise be performed) during the server frame.

Furthermore, conventional line of site determinations are error prone in many instances, and therefore fail to provide a good estimate of the relative safety of a given spawn location. For example, even though a given map node may not have a direct line of site to a spawn location, an enemy player at that map node may have to make only minimal movements to gain line of site to the spawn location, in which case the direct line of site test would not be a good indicator of the safety of the spawn location. For these and other reasons, it may not be possible to estimate the length of time a player might expect to live if re-spawned at a given spawn location using conventional direct line of site spawn systems.

These and other drawbacks exist with conventional spawning systems for video games.

SUMMARY OF THE INVENTION

The invention addressing these and other drawbacks relates to a system and method for generating, for a given game map, a line of site ("LOS") catalog of minimum distances to travel to achieve line of site to potential spawn locations, and identifying a spawn location during gameplay based on the LOS catalog.

As used herein, the terms "spawn" and "respawn" may be used interchangeably unless expressly indicated otherwise. Further, references herein to a "player" being spawned/respawned should be understood to refer to and encompass any video game character or object controlled by (or otherwise representing) the player being spawned/respawned.

Moreover, while aspects of the invention may be described herein with reference to various game levels or modes, game maps, characters, roles, game items, etc. associated with a "shooter" game, it should be appreciated that any such examples are for illustrative purposes only, and are not intended to be limiting. The system and method described in detail herein may be used in any genre of video game, without limitation, in which a video game character or object may be spawned/re-spawned. Further, the description, layout, content, etc. of any game map described herein or depicted in the accompanying drawing figures is for exemplary purposes only, and is not intended to be limiting. Additionally, while aspects of the invention may be further described with reference to multiplayer video games, it should be recognized that the features and functionality described herein are equally applicable to a single player video game.

According to an aspect of the invention, each map node of a given game map may be identified by a map node identifier. For each map node of a game map, the LOS catalog may indicate a minimum distance to travel to or from each other map node of the game map to achieve LOS to the map node. In other words, for every unique pair of map nodes in a game map, the LOS catalog may indicate the minimum distance that must be traveled from a first map node of the pair to achieve LOS to a second map node of the pair, an identifier for the first map node, and an identifier for the second map node. In some implementations, the LOS catalog may be pre-computed (e.g., before gameplay), indexed by map node identifier(s), and stored for later retrieval. Therefore, computational processing may be performed "offline" and not during gameplay. Later, when a gameplay session is initiated, the LOS catalog may be retrieved and used to identify relatively safe spawn points.

In one implementation, the minimum distance values of the LOS catalog may be used to determine the proximity of unsafe map nodes around a potential spawn location during gameplay. For example, to assess the relative safety of a spawn location at a first map node, the system may identify all enemy (or opponent) positions (e.g., at various map nodes). For each enemy position (referred to as an "enemy map node"), the system may look up the first map node and the enemy map node pair in the LOS catalog to identify the minimum distance of travel between the two map nodes to achieve LOS. A larger (or greater) minimum distance equates to a relatively safer spawn location because an enemy would have to traverse a longer (or greater) distance to achieve LOS compared to a smaller (or lesser) minimum distance.

The system may select the smallest (or lesser) one of these minimum distances as the representative value for a given spawn location so that the safety of a given spawn location may be measured based on an enemy map node that is closest to achieving LOS to the spawn location. The system may repeat the foregoing process for each spawn location, and compare the smallest one of the minimum distances in order to select the safest spawn location.

For example, if a first spawn location is a minimum distance of five distance units from a first enemy node, and a minimum distance of six distance units from a second enemy node, then the minimum distance of five will used as a representative value for the first spawn location. If a second spawn location is a minimum distance of two distance units from the first enemy node and a minimum distance of five distance units from the second enemy node, then the minimum distance of two will be used as a representative value for the second spawn location. The system in this example may select the first spawn location to spawn a player because its minimum distance (five distance units) is greater than the second spawn location's minimum distance (two distance units). In other words, an enemy would have to travel further (five distance units) to achieve LOS to the first spawn location than to the second spawn location (two distance units).

As illustrated in the foregoing example, the system may select the relatively most safe spawn location, while taking into account only slight movements that may be necessary to achieve LOS to the spawn location. Such selection may be efficiently performed during gameplay because the LOS catalog has been (in some implementations) pre-computed.

According to an aspect of the invention, to generate an LOS catalog, the system may, for each map node of a game map, perform pairwise processing with respect to every other map node of the game map. In these implementations, any given pair of map nodes may be processed. In other implementations, the system may, for each potential spawn location, perform pairwise processing with respect to every other map node. In these implementations, only pairs involving each spawn location and every other map node may be processed.

The pairwise processing may include determining whether LOS exists between the pair of map nodes. If so, the system may store an indication (e.g., minimum distance of zero) in the LOS catalog that direct LOS exists between the pair of map nodes, and then proceed to processing the next pair of map nodes. If no LOS exists between the pair of map nodes, the system may identify a path between the two map nodes using a pathfinding algorithm. The pathfinding algorithm may identify the shortest path between the pair of map nodes.

The system may traverse the path in a first direction (e.g., from a first map node of the pair to a second map node of the pair) and determine whether LOS exists as the path is traversed. For example, at each interim map node (if any), the system may determine whether LOS exists between the interim map node and the destination node (e.g., the second map node). The system may record a first distance traveled in the first direction to achieve LOS to the destination node. The system may then traverse the path in a second direction (e.g., opposite the first direction, from the second map node of the pair to the first map node of the pair). The system may record a second distance traveled in the second direction to achieve LOS to the destination node (e.g., the first map node). The system may select the smaller of the first distance and the second distance as a minimum distance value for the map node pair and generate an entry in the LOS catalog using the selected distance. This is to account for either the spawned player or an enemy player (who would each traverse the path in opposite directions relative to the other) traversing the path to achieve LOS.

In some instances, based on information that identifies a known map node having LOS to a destination node, the system may diverge from the path and traverse from a location along the path to the known map node. This may represent a new path (e.g., not necessarily the shortest path found by the pathfinder) in which LOS may be achieved more quickly than if the path had been faithfully traversed. In this manner, the system may account for known map nodes having direct LOS (e.g., based on previous pairwise processing) to a destination node when determining minimum distances for the LOS catalog.

The system may repeat the foregoing pairwise processing for each unique map node pair (or for each unique spawn location and map node pair), thereby building a comprehensive listing of minimum distances to achieve LOS between any two map nodes.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention described herein relates to a system and method for generating, for a given game map, a minimum distance to LOS catalog (also referred to interchangeably herein as "LOS catalog") and identifying a spawn location during gameplay based on the LOS catalog.

The LOS catalog may, for each potential spawn location of a game map, indicate a minimum distance to travel from each other map node of a game map to achieve LOS to the potential spawn location. In other words, for every spawn location and other map node pair, the LOS catalog may indicate the minimum distance that may be traveled from the other map node to the spawn location to achieve LOS. A distance may be measured in any distance unit defined by a given video game. As such, the distances provided in a given LOS catalog may be specific for a given video game or game map.

The minimum distance may represent a distance that an enemy player (or opponent) at a given map node, for example, would have to travel before a player spawned at the potential spawn location is visible to the enemy player. In this context, a first spawn location having a greater minimum distance from a given map node (occupied by an enemy player) to achieve LOS may be safer than a second spawn location having a smaller minimum distance from a given map node occupied by an enemy player (occupied by an enemy player) to achieve LOS. Other factors may be considered to assess the relative safety of a spawn location as well. As such, the LOS catalog may be used to identify a safe spawn location, from among various spawn locations, based on information from the LOS catalog and one or more enemy locations (e.g., map nodes at which an enemy or opponent is located).

Exemplary System Architecture

Figure 1:
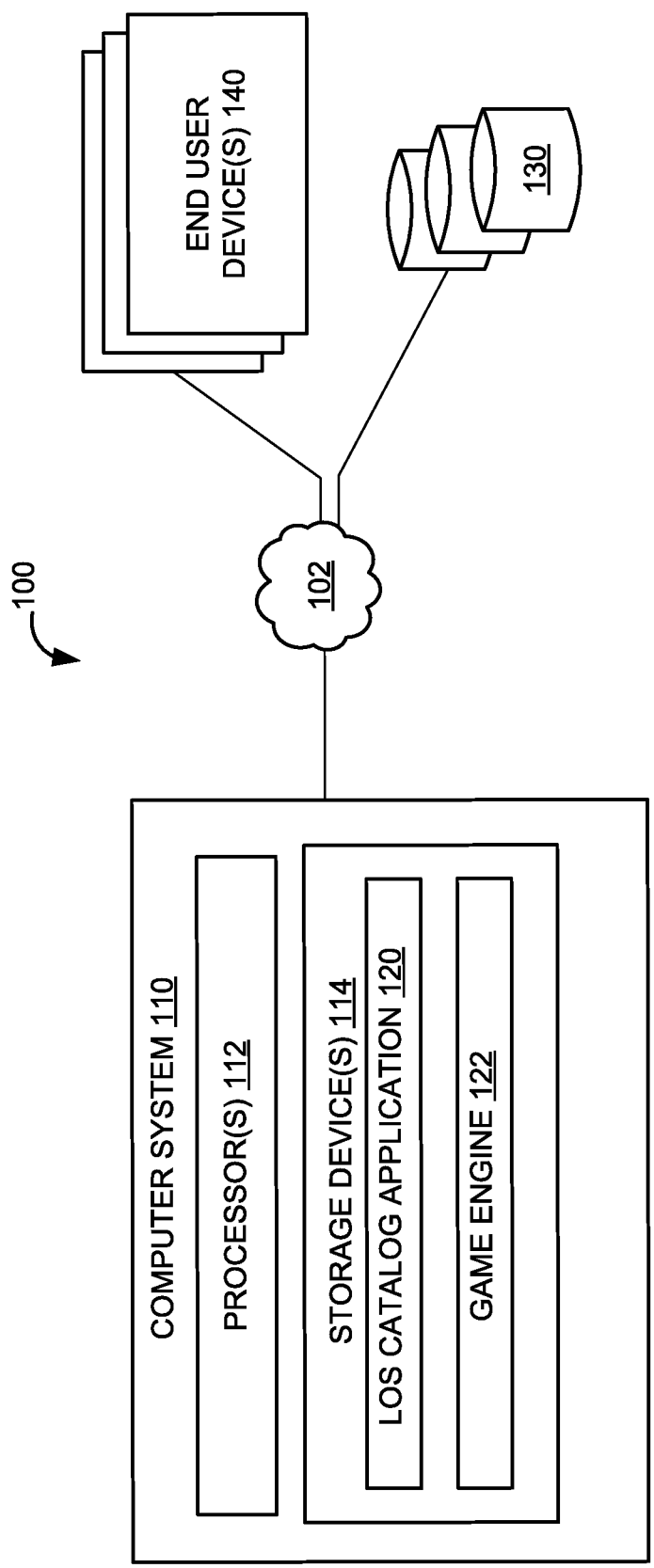
FIG. 1 illustrates a system of generating, for a given game map, a minimum distance to LOS catalog and identifying a safe spawn location during gameplay based on the LOS catalog, according to an implementation of the invention.

FIG. 1 depicts an exemplary architecture of a system 100 of generating, for a given game map, a minimum distance to LOS catalog and identifying a safe spawn location during gameplay based on the LOS catalog, according to an implementation of the invention.

In one implementation, system 100 may include one or more computer systems 110, one or more databases 130, one or more end user devices 140, and/or other components.

Computer system 110 may be configured as a server (e.g., having one or more server blades, processors, etc.), a gaming console, a handheld gaming device, a personal computer (e.g., a desktop computer, a laptop computer, etc.), a smartphone, a tablet computing device, and/or other device that is programmed to generate a distance to LOS catalog and/or identify safe spawn locations as described herein.

Computer system 110 may include one or more processors 112 (also interchangeably referred to herein as processors 112, processor(s) 112, or processor 112 for convenience), one or more storage devices 114 (which may store a LOS catalog application 120 and a game engine 122), and/or other components. Processors 112 may be programmed by one or more computer program instructions. For example, processors 112 may be programmed by LOS catalog application 120 and/or other instructions. LOS catalog application 120 and game engine 122 may each include various instructions that program computer system 110. As described herein, LOS catalog application 120 and game engine may each be described as programming computer system 110 to perform various operations. However, it should be understood that a portion (or all) of LOS catalog application 120 and/or game engine 122 may, alternatively or additionally, program other system components (e.g., end user device 140) to perform at least some of the functions of the applications.

According to an aspect of the invention, end user device 140 may be configured as a gaming console, a handheld gaming device, a personal computer (e.g., a desktop computer, a laptop computer, etc.), a smartphone, a tablet computing device, and/or other device that can be programmed to perform various functions (e.g., of LOS catalog application 120) described herein. Although not illustrated in FIG. 1, an end user device 140 may include one or more physical processors programmed by computer program instructions. For example, end user device 140 may be programmed by all or a portion of LOS catalog application 120 (e.g., when hosting a multi-player video game with other user devices, or when locally playing a multi-player video game with multiple users).

Although illustrated in FIG. 1 as single components, computer system 110 and end user device 140 may each include a plurality of individual components (e.g., computer devices), each programmed with at least some of the functions described herein. In this manner, some components of computer system 110 and/or end user device 140 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various databases 130 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. Database 130 may comprise one or more such databases that reside in one or more physical devices and in one or more physical locations. Database 130 may store a plurality of types of data and/or files and associated data or file descriptions, administrative information, or any other data.

Each of the various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The foregoing system architecture is exemplary only and should not be viewed as limiting. Other system configurations may be used as well, as would be appreciated by those having skill in the art.

LOS Catalog Application 120 and Game Engine 122

Figure 2:
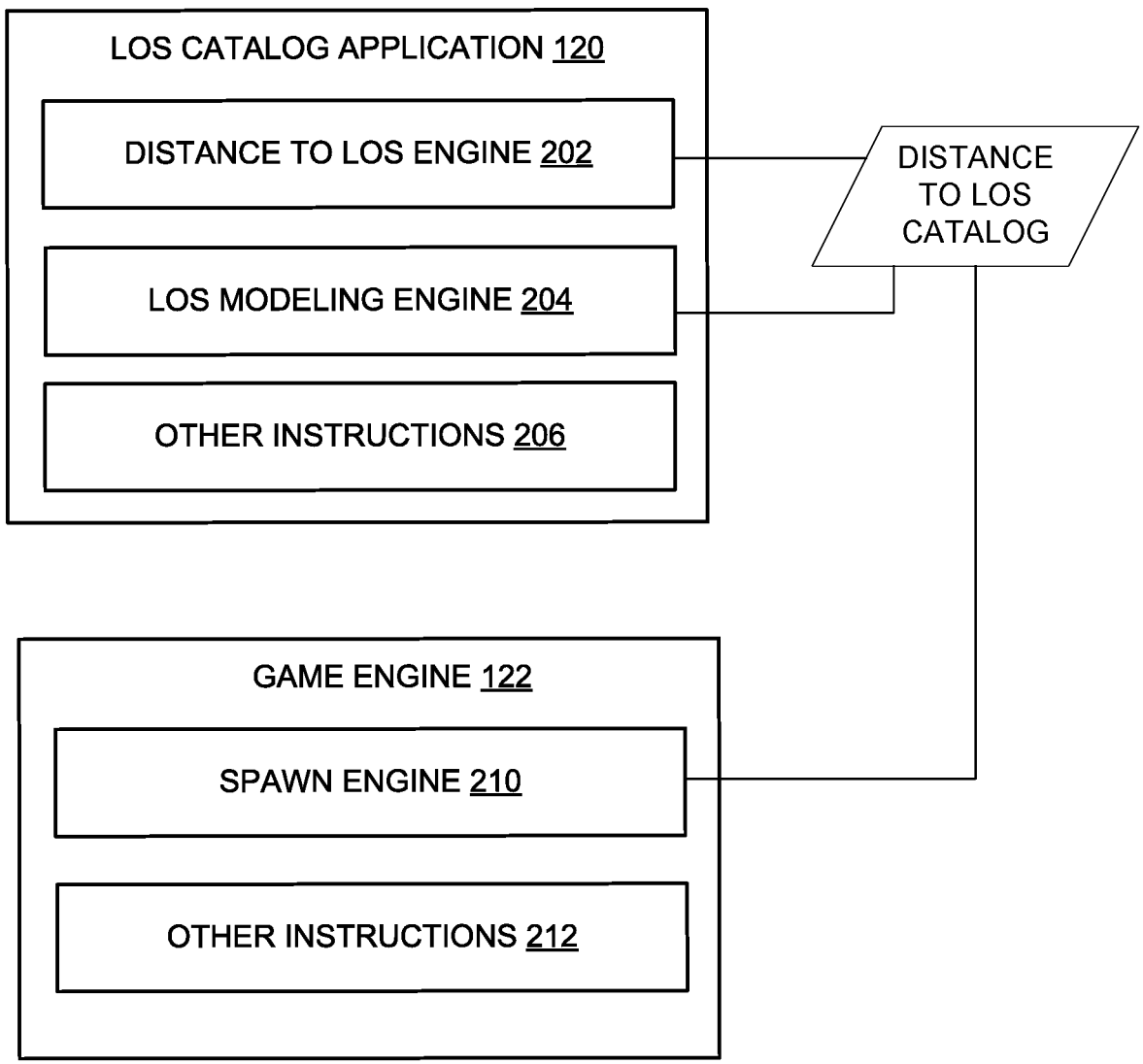
FIG. 2 depicts a block diagram of a LOS catalog application and a game engine, according to an implementation of the invention.

FIG. 2 depicts an exemplary block diagram of LOS catalog application 120 and game engine 122, according to an implementation of the invention. LOS catalog application 120 may generate a distance to LOS catalog. Game engine 122 may use the LOS catalog, together with information indicating whether unsafe elements exist at a given game node, to identify a spawn location at which to spawn a player.

The instructions of LOS catalog application 120 may include, without limitation, a distance to LOS engine 202 (referred to interchangeably as "LOS engine 202"), a LOS modeling engine 204, and/or other instructions 206 that program computer system 110 to perform various operations, each of which are described in greater detail herein.

Game engine 122 may include a spawn engine 210 that identifies spawn locations for players during gameplay based on the LOS catalog and in-game information and/or other instructions. As used herein, for convenience, the various instructions will be described as performing an operation, when, in fact, the various instructions program the processors 112 (and therefore computer system 110) to perform the operation.

When describing various implementations of generating a LOS catalog, reference throughout this disclosure will be made to FIGS. 3, 4A, 4B, 4C, 4D, 5A, and 5B, as well as various processing operations illustrated in FIGS. 6, 7A, and 7B.

When describing various implementations of using the LOS catalog to identify spawn locations for players, reference throughout this disclosure will be made to FIGS. 8 and 9.

Figure 3:
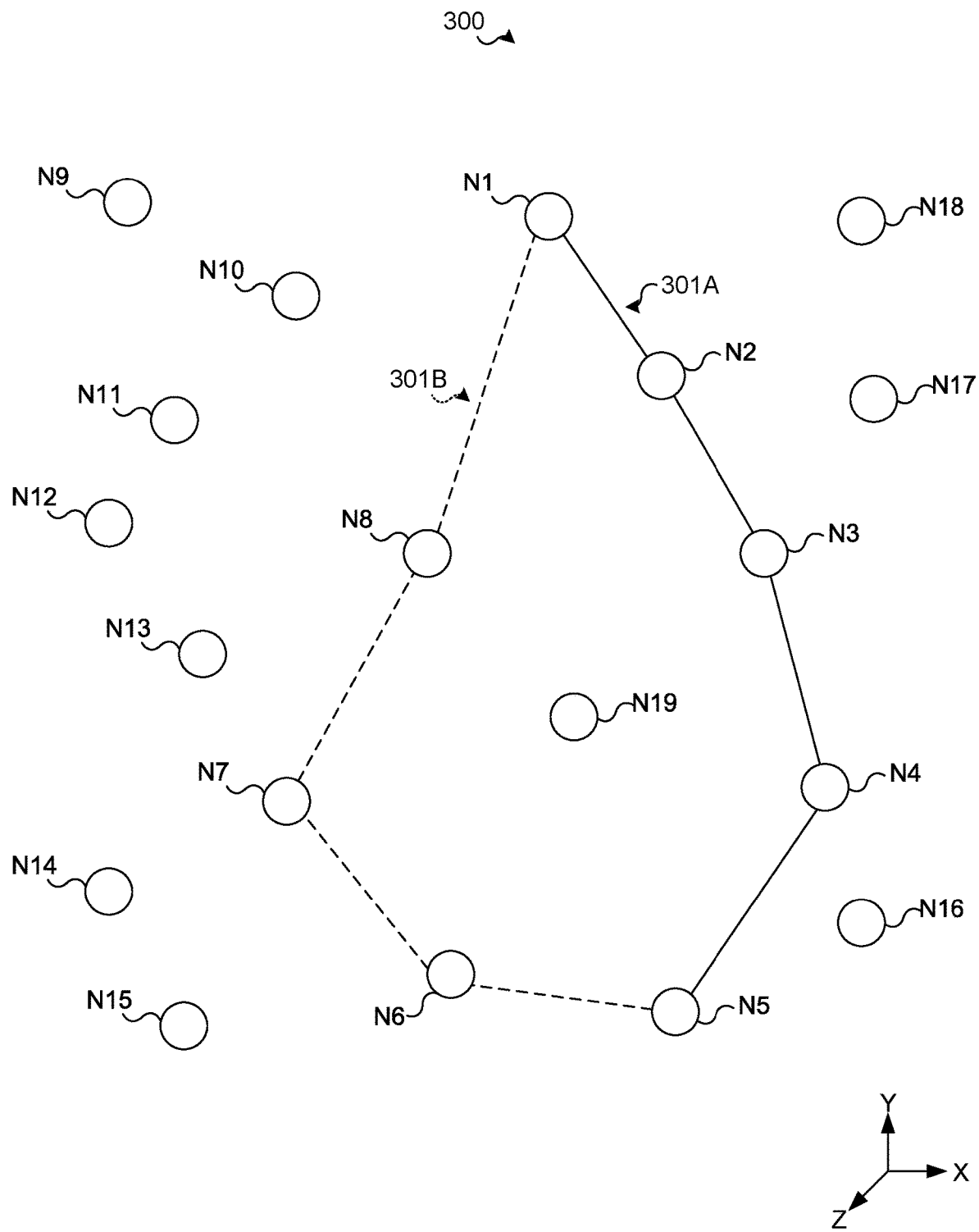
FIG. 3 depicts a schematic diagram of map nodes of a game map and exemplary paths between a first map node and a second map node, according to an implementation of the invention.

FIG. 3 depicts a schematic diagram 300 of map nodes N1-N18 of a game map and exemplary paths 301A, 301B between a first map node N1 and a second map node N5, according to an implementation of the invention. A given map node may represent an area of a game that a player (e.g., the player's character, object, etc.) may traverse during gameplay. Each map node may include 2-dimensional or 3-dimensional coordinates/characteristics, depending on the type of game to which the game map relates. The various map nodes N1-N18 are exemplary only. Other numbers and configurations of map nodes may be used depending on the design of the game map. Furthermore, some or all of the map nodes N1-N18 may serve as potential spawn locations, depending on a game designer's default selections, user configurations, and/or other information that indicates which map nodes of a game map should be used as potential spawn locations.

Various pathfinding algorithms may identify the shortest path between two map nodes and calculate the minimum distance to achieve LOS between the two map nodes along the shortest path (as will be described further below). In the Figures, the shortest path is illustrated as path 301A, and will be used in examples herein throughout. Using the shortest path approach, the minimum distance to LOS between a map node and a spawn location may represent the shortest distance that an enemy player at the map node must travel to achieve LOS to a player spawned at the spawn location.

In some implementations, the system may identify and traverse two or more paths (which may represent the shortest N paths or all paths) between two map nodes, and calculate a minimum distance to LOS for each path. The system in these implementations may use the average minimum distances, mean minimum distances, and/or other cumulative minimum distances associated with the multiple paths to determine the minimum distance to LOS between two nodes. For example, the minimum distance from a map node to a spawn location may be determined by averaging the minimum distances along two or more paths. For computational efficiency, however, only the shortest path between two map nodes may be used to determine a minimum distance to LOS for the two map nodes.

Figure 4A:
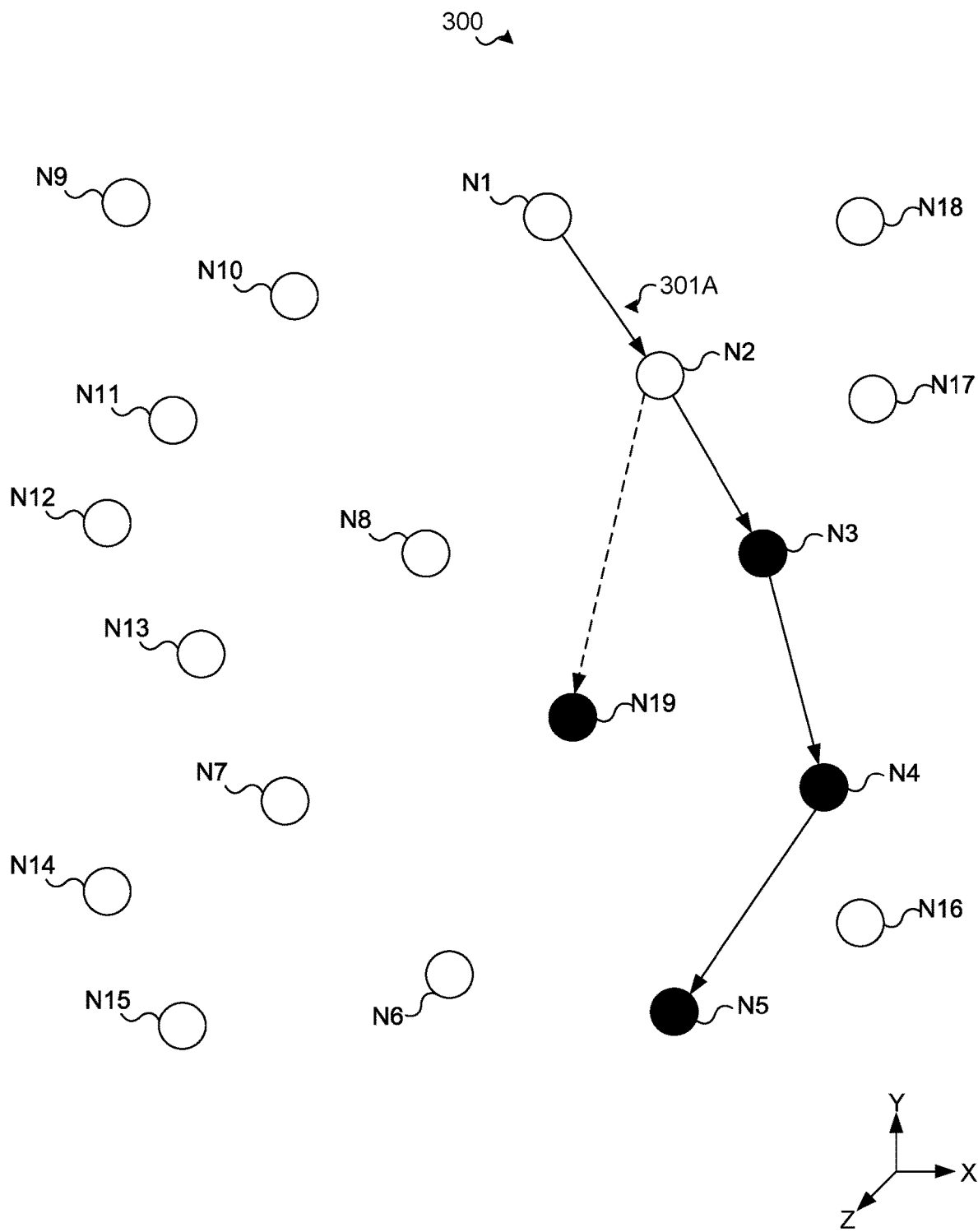
FIG. 4A depicts a schematic diagram of traversing a path from the second map node to the first map node in a first direction to identify the minimum distance to travel from the second map node to the first map node to achieve LOS to the first map node, according to an implementation of the invention.

FIG. 4A depicts a schematic diagram of traversing a path 301A from the second map node N1 to the first map node N5 in a first direction (denoted by the arrows) to identify the minimum distance to travel from the second map node to the first map node to achieve LOS to the first map node, according to an implementation of the invention. Filled (or solid) map nodes (e.g., N3 and N4, N19) represent nodes in which LOS to the first map node N5 exists. In some instances, a nearby node having known LOS to a target node, but not on the identified path, may be traversed to from the path to measure the distance to travel to the nearby node. For example, even though map node N19 is not on path 301A, it may be traversed to because it has known LOS to map node N5 (e.g., based on prior traversals of the game map). This may be the case whether or not there exists a path from N19 to map node N5, so long as there exists LOS between N19 and map node N5. Traveling to N19 from path 301A may, in some instances, represent the minimum distance to achieve LOS to the target N5 from map node N1 even though N19 is not on path 301A.

Figure 4B:
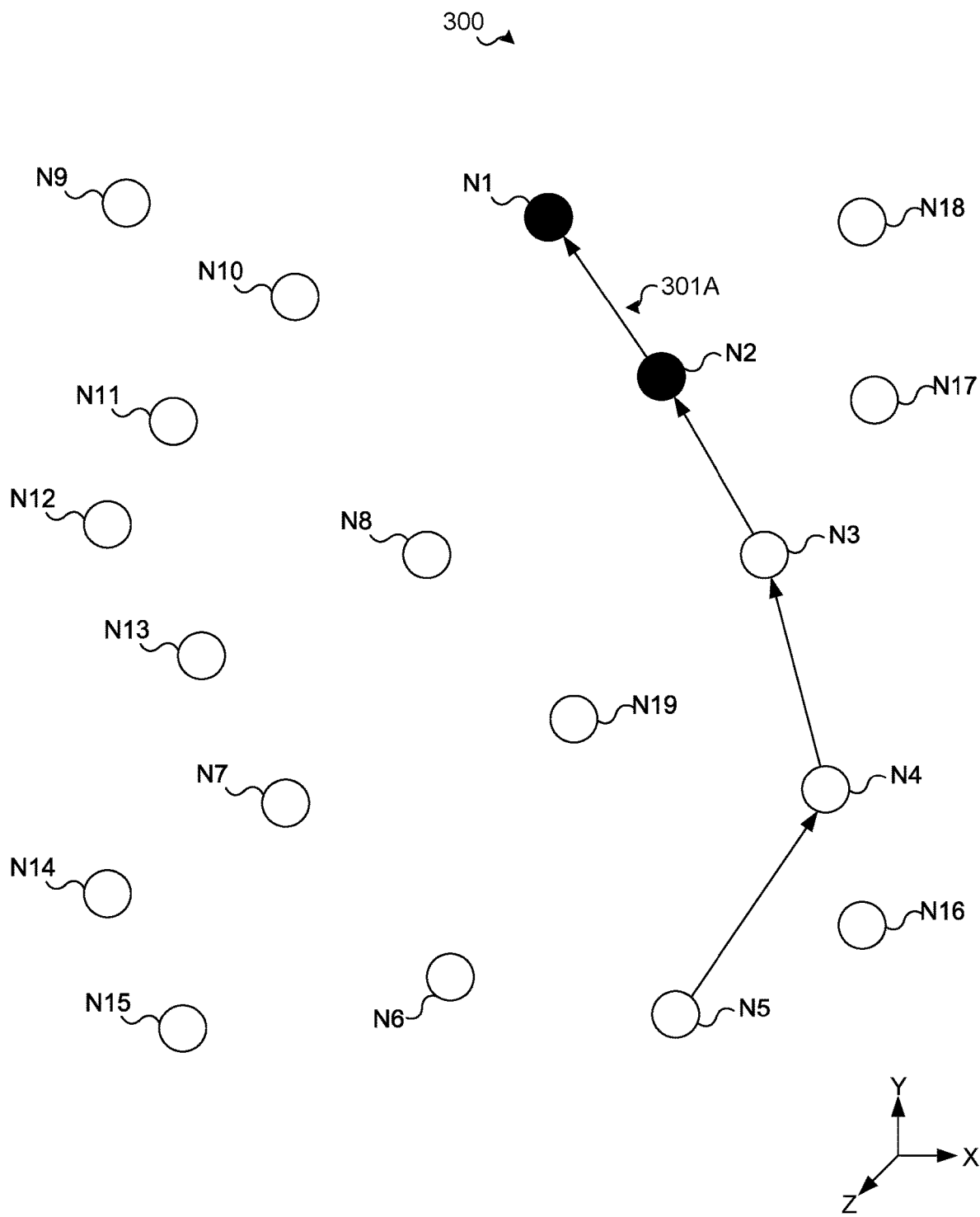
FIG. 4B depicts a schematic diagram of traversing the path from the first map node to the second map node in a second direction to identify the minimum distance to travel from the second map node to the first map node to achieve LOS to the first map node, according to an implementation of the invention.

FIG. 4B depicts a schematic diagram of traversing the path 301A from the first map node N5 to the second map node N1 in a second direction (denoted by the arrows, and opposite the direction of FIG. 4A) to identify the minimum distance to travel from the second map node to the first map node to achieve LOS to the first map node, according to an implementation of the invention. Filled (or solid) map nodes (e.g., N2) represent nodes in which LOS to the second map node N1 exists.

Figure 4C:
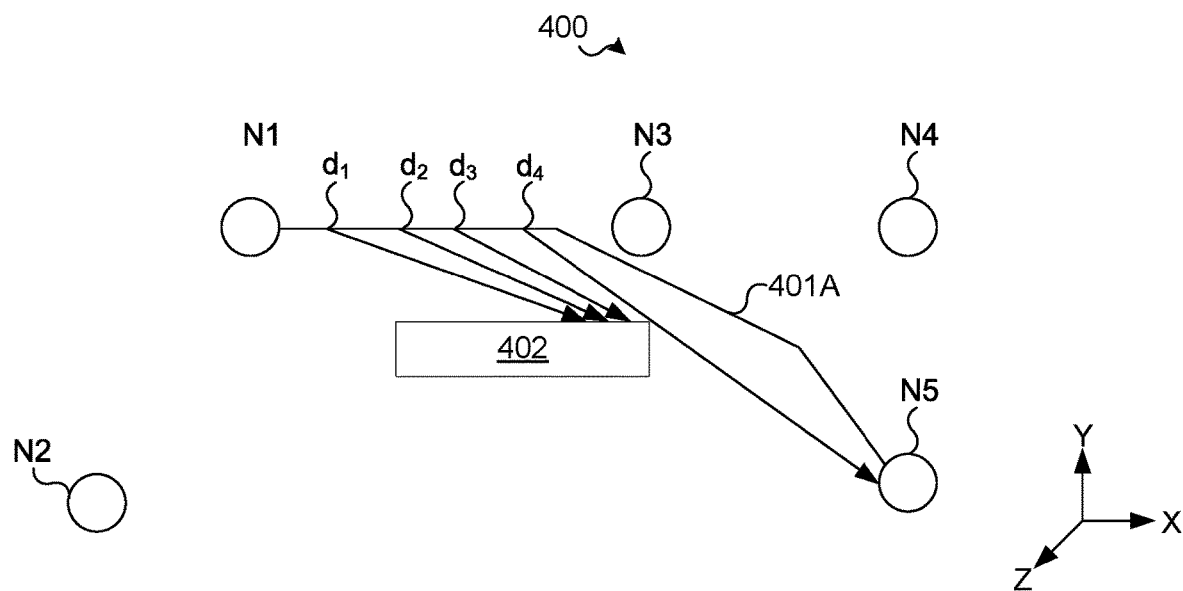
FIG. 4C depicts a schematic diagram of traversing a path that includes non-node positions between a pair of map nodes to determine a minimum distance to LOS between the map nodes, according to an implementation of the invention.

FIG. 4C depicts a schematic diagram 400 of traversing a path 401A that includes non-node positions between a pair of map nodes (N2, N5) to determine a minimum distance to LOS between the map nodes (N2, N5), according to an implementation of the invention. As used herein, a non-node position (e.g., positions indicated by distances traversed $d_{1-6}$ of FIGS. 4C and 4D) on a map is a position (e.g., an Artificial Intelligence mesh point) that is not a map node but can be traversed by a player. Typically, though not necessarily, such non-node positions may be generated after a map is compiled or otherwise instantiated (e.g., after the map has been designed by a game developer or others).

As illustrated in FIG. 4C, a visual obstruction 402 (e.g., a virtual object) may obstruct LOS between a given pair of positions (whether either position is a node or non-node position) on a game map. Such LOS obstruction may be in two or more dimensions. LOS engine 202 may traverse a path 401A between nodes N1 and N5. Although not illustrated, LOS engine 202 may traverse path 401A in two directions (e.g., a first direction from N1 to N5 and a second direction, which may be a reverse of the first direction, from N5 to N1) and compare the results of the two passes to determine an overall minimum distance to achieve LOS, as described herein. At various points (e.g., points defined by distances traveled $d_{1-4}$) along path 401A, LOS engine 202 may determine whether LOS exists between each point and node N5. As illustrated, LOS engine 202 may determine that LOS is first detected from N1 to N5 along path 401A at a point corresponding to a distance traveled $d_4$. LOS engine 202 may store this value as a first minimum distance for the first pass from N1 to N5. LOS engine 202 may repeat the foregoing operations in a second pass from N5 to N1 to determine a second minimum distance to achieve LOS. LOS engine 202 may select the smaller of the first and the second minimum distances as representative of the minimum distance to achieve LOS between nodes N1 and N5.

Figure 4D:
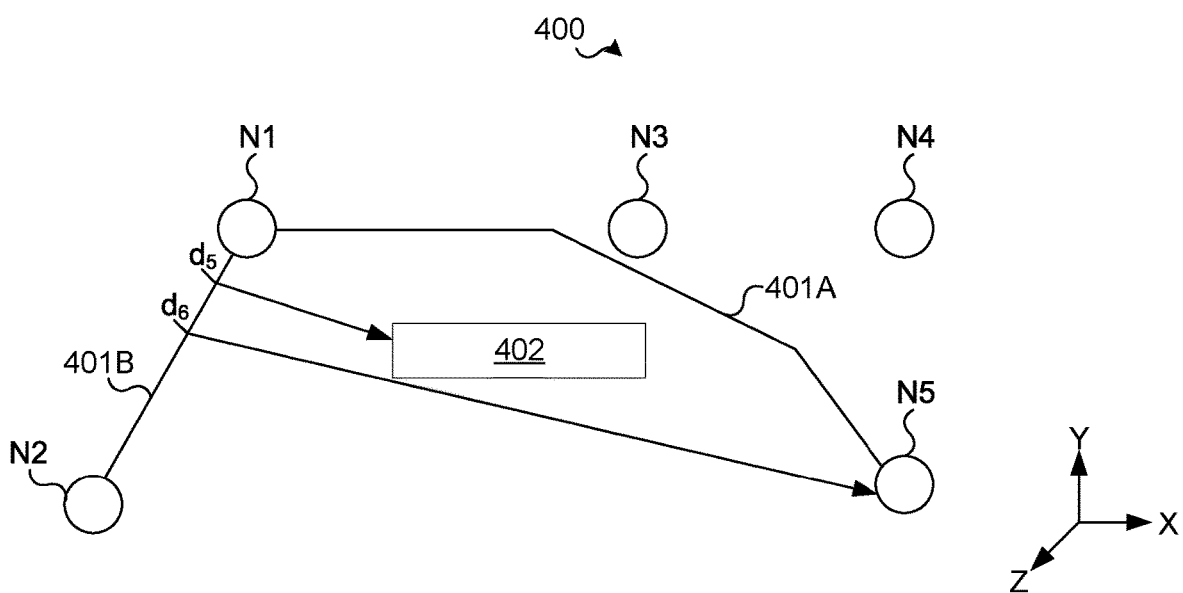
FIG. 4D depicts a schematic diagram of traversing an alternative path that includes non-node positions, based on previously known LOS information, to determine a minimum distance to LOS between a pair of map nodes, according to an implementation of the invention.

FIG. 4D depicts a schematic diagram 400 of traversing an alternative path 401B that includes non-node positions, based on previously known LOS information, to determine a minimum distance to LOS between a pair of map nodes (N2, N5), according to an implementation of the invention. In some implementations, LOS engine 202 may access information that indicates LOS between a pair of map nodes (e.g., N2 and N5) exists, and use that information when determining a minimum distance to achieve LOS between another pair of map nodes (e.g., N1 and N5). For example, because LOS is known to exist between N2 and N5, LOS engine 202 may identify a path 401B from N1 to N2 when determining a minimum distance to achieve LOS between N1 and N5. This is because pathing from N1 to N2 may identify a position along path 401B (which may include N2 itself, a non-node position (as illustrated in FIG. 4D), or intervening nodes (not illustrated in FIG. 4D) along path 401B) that has LOS to N5 at a smaller distance than any points along path 401A (illustrated in FIG. 4C).

Although not explicitly illustrated in the Figures, LOS engine 202 may traverse a path that includes both nodes and non-node positions as well.

Figure 5A:
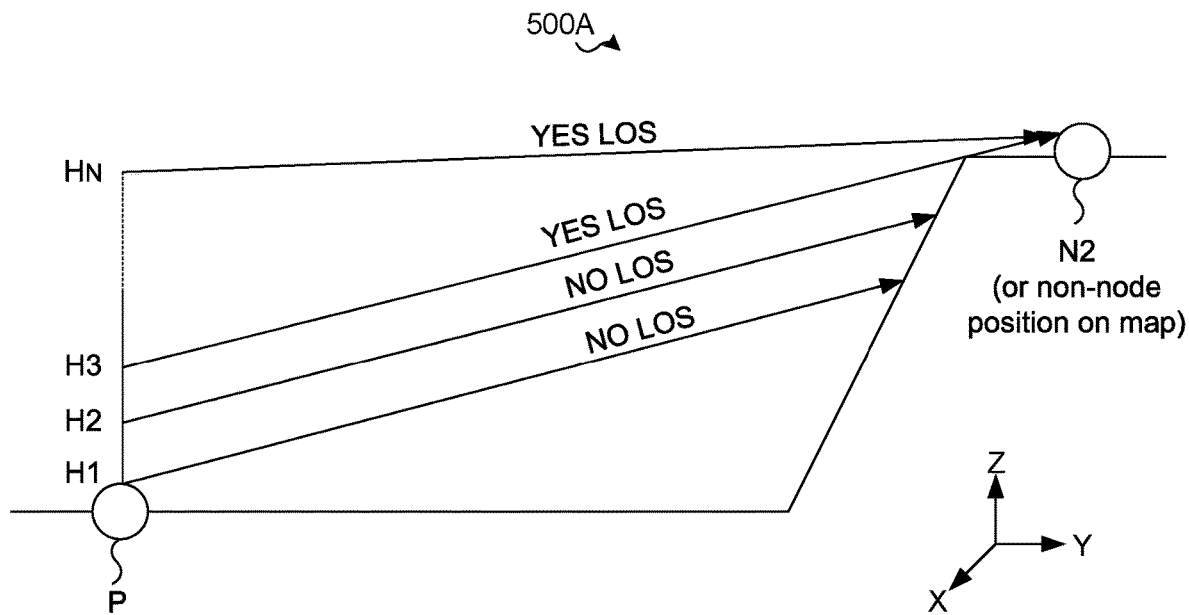
FIG. 5A depicts a schematic diagram of determining whether LOS exists between two map nodes, according to an implementation of the invention.
Figure 5B:
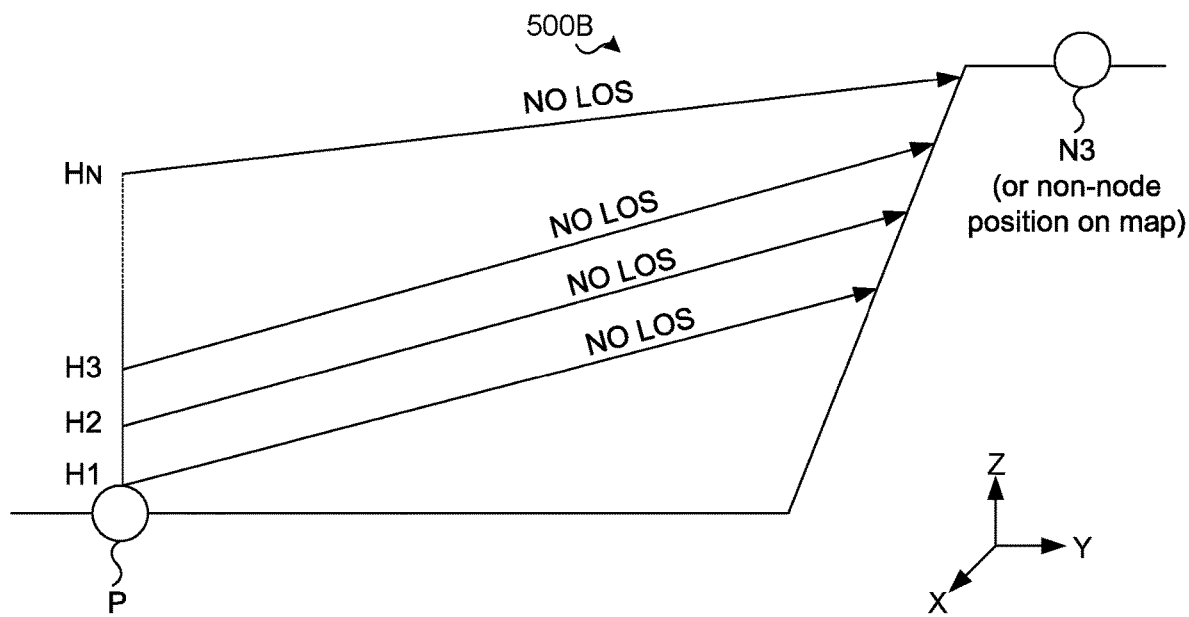
FIG. 5B depicts a schematic diagram of determining whether LOS exists between two map nodes, according to an implementation of the invention.

FIG. 5A depicts a schematic diagram 500A of determining whether LOS exists between two map nodes N1 and N2, according to an implementation of the invention. FIG. 5B depicts a schematic diagram 500B of determining whether LOS exists between two map nodes N1 and N2, according to an implementation of the invention. FIGS. 5A and 5B illustrate testing whether LOS exists at various heights (H1, H2, H3, . . . $H_N$).

Generating a LOS Catalog

Figure 6:
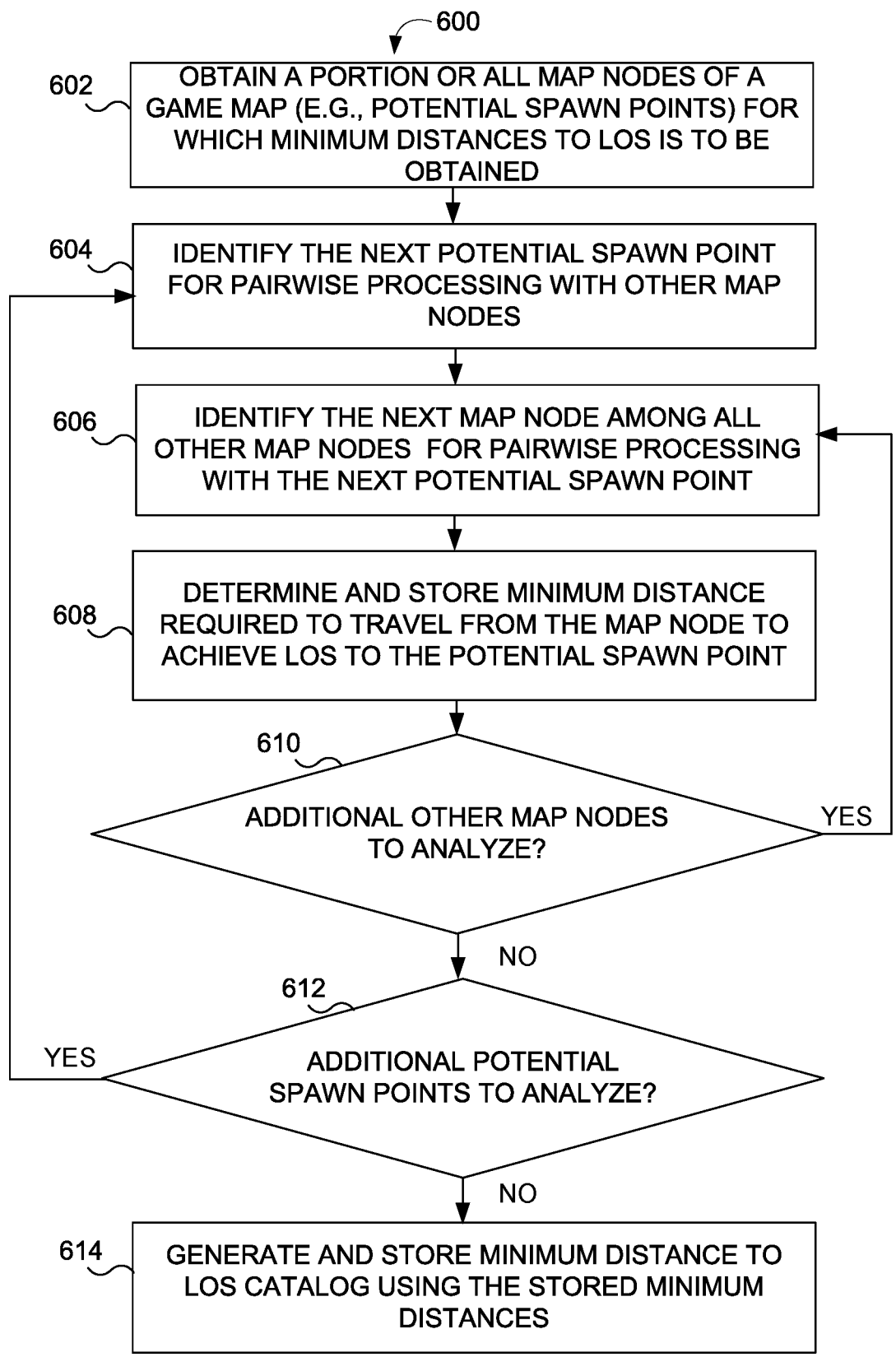
FIG. 6 depicts a process of generating a minimum distance to LOS catalog, according to an implementation of the invention.

FIG. 6 depicts a process 600 of generating a minimum distance to LOS catalog, according to an implementation of the invention. Although LOS engine 202 is described below as performing various operations of process 600, other components of system 100 may, alternatively or additionally, perform one or more operations of process 600. Furthermore, in the examples that follow, although a potential spawn location is described as being analyzed with respect to another map node, process 600 may be used to determine minimum distance to LOS between any pair of map nodes of a game map.

In an operation 602, LOS engine 202 may obtain a set of map nodes for which minimum distances to LOS is to be obtained. The set of map nodes may include potential spawn locations, which may include a portion or all map nodes of a game map. The potential spawn locations may be preselected by a game designer, modified by a player or others, and/or may otherwise be selected from among map nodes of the game map.

In an operation 604, LOS engine 202 may identify a potential spawn location from among the set of potential spawn locations for pairwise processing with other map nodes. For example, as will be described below, for each potential spawn location, LOS engine 202 may iterate through each other map node of the game map to build a catalog of minimum distances required to travel from each other map node to the potential spawn location to achieve LOS to the potential spawn location.

This process may be iterated for each potential spawn location, building a comprehensive set of minimum distances to achieve LOS to a given spawn location from a given map node. For example, referring to FIG. 3, a potential spawn location (map node N1) may be analyzed with respect to each other map node (map nodes N2-N18) to determine a minimum distance that must be travelled from another map node to achieve LOS with the potential spawn location. To do so, a path may be traversed from the other map node to the potential spawn location. Determining a minimum distance that must be traveled from another map node N5 to achieve LOS to a potential spawn location N1 is illustrated. To determine the minimum distance, one or more paths (301A, 301B, 401A, 401B) between the potential spawn location N1 and other map node N5 may be traversed.

The foregoing process may be repeated for each potential spawn location/other map node pair to generate the LOS catalog. Assuming that all unique pairwise comparisons of map nodes are performed, the total number of pairwise comparisons would be given by equation (1) below:

$$N^2 \qquad (1),$$

wherein N=number of map nodes in a game map.

As an example, for 18 map nodes, the foregoing would yield 324 pairwise comparisons.

However, LOS engine 202 may optimize storage requirements of a LOS catalog. For example, LOS engine 202 may ignore self-node comparisons (e.g., node N1 to N1) and store only the smaller of the directions from a given map node to another map node (e.g., N1 to N2 and N2 to N1). Assuming only the foregoing optimizations are made (further optimizations may be performed as well), the total number of pairwise comparisons would be given by equation (2) below:

$$\frac{N*(N+1)}{2}, \qquad (2)$$

wherein N=number of map nodes in a game map.

According to equation (2), for 18 nodes, the number of entries in the LOS catalog would be equal to 171, a reduction from 324. Using the foregoing and other optimization techniques, the processing requirements to generate and the storage requirement to store the LOS catalog may be substantially reduced.

In an operation 606, LOS engine 202 may identify the next map node from among the other map nodes for processing with the next potential spawn location identified in operation 604.

In an operation 608, LOS engine 202 may determine and store (in a memory) a minimum distance required to travel from the second map node to achieve LOS to the first map node. Such storage may be temporary until iterative processing of process 600 is complete, resulting in generation of the LOS catalog. The determined minimum distance may be indicative of the relative safety of the analyzed spawn location (e.g., the first map node) with respect to another map node (e.g., the second map node) of the game map. Details of determining the minimum distance are described in greater detail with respect to FIGS. 7A and 7B.

In an operation 610, LOS engine 202 may determine whether there exist additional other map nodes to analyze. Responsive to a determination that other map nodes are to be analyzed, LOS engine 202 may return to operation 606 and identify another map node to analyze with respect to the potential spawn location. Responsive to a determination that no other map nodes are to be analyzed, meaning that for a given potential spawn location, all pairwise comparisons with other map nodes of the game map have been analyzed, in an operation 612, LOS engine 202 may determine whether other potential spawn locations are to be analyzed. Responsive to a determination that other potential spawn locations are to be analyzed, LOS engine 202 may return to operation 604, where the next spawn location to be analyzed is identified.

Responsive to a determination that other potential spawn locations are to be analyzed, in an operation 614, LOS engine 202 may generate and store the LOS catalog based on the stored minimum distances. For example, the game map, LOS catalog, and/or any versions thereof, may be stored at and retrieved from an LOS database, such as a database 130.

Table 1 (below) illustrates an exemplary LOS catalog (e.g., generated by process 600) that includes entries for two potential spawn locations (N1 and N2) and a total of 18 map nodes N1-N18. It should be understood that the entries in Table 1 (and Table 2 below) are for illustrative purposes only. Typically, there are hundreds of map nodes (if not more) and dozens of potential spawn locations (if not more) in a given game map.

TABLE 1

| Potential Spawn Location | Map Node | Minimum Distance to LOS |
| --- | --- | --- |
| N1 | N2 | 3 |
| N1 | N3 | 5 |
| N1 | N4 | 5 |
| N1 | N5 | 5 |
| N1 | ... | ... |
| N1 | N18 | 4 |
| N2 | N3 | 3 |
| N2 | N4 | 3 |
| N2 | N5 | 3 |
| N2 | ... | ... |
| N2 | N18 | 6 |

Determining a Minimum Distance to LOS Between Two Map Nodes

Figure 7A:
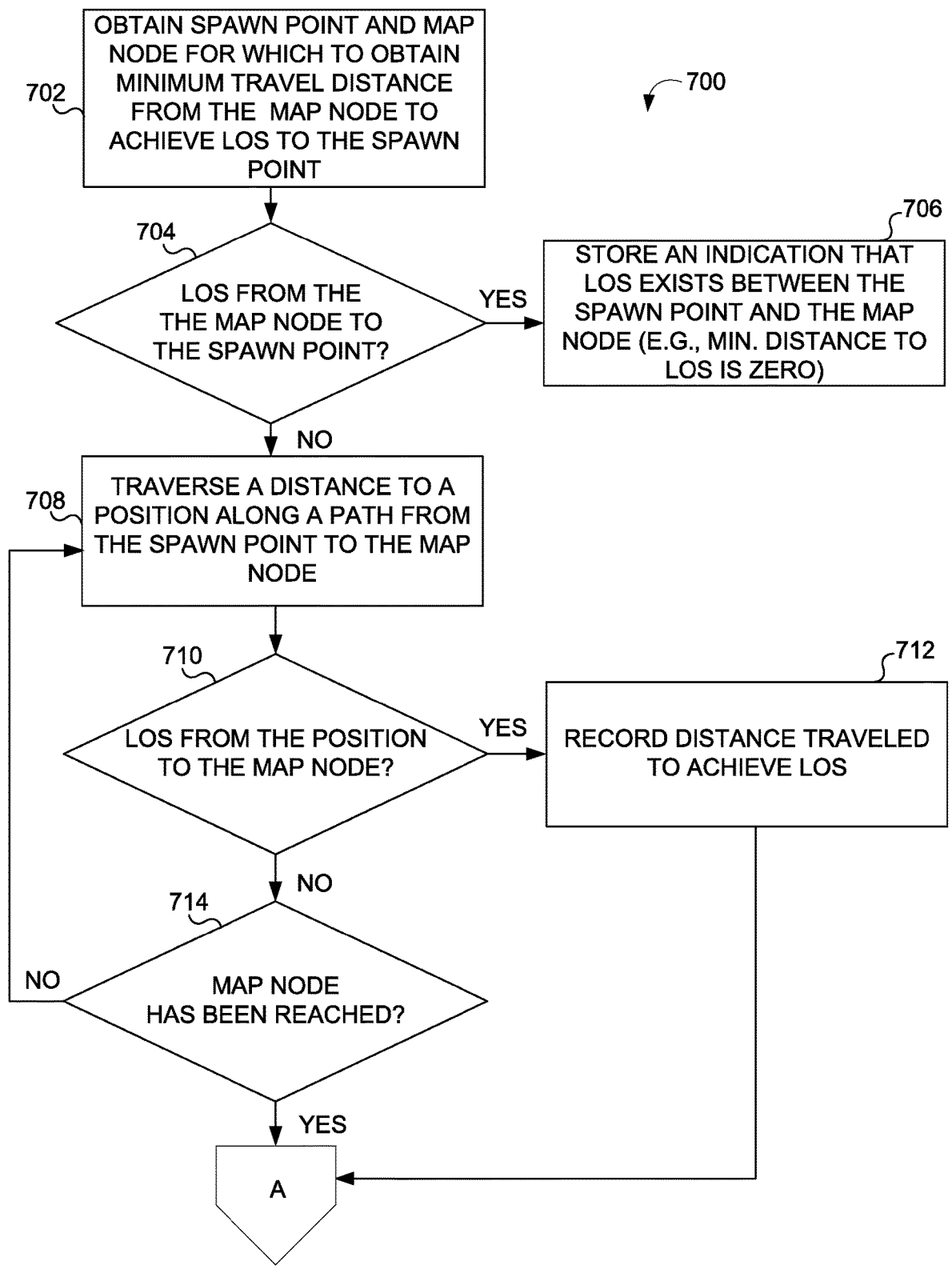
FIG. 7A depicts a first portion of a process of determining a minimum distance to travel from a given map node to achieve LOS to a potential spawn location, according to an implementation of the invention.
Figure 7B:
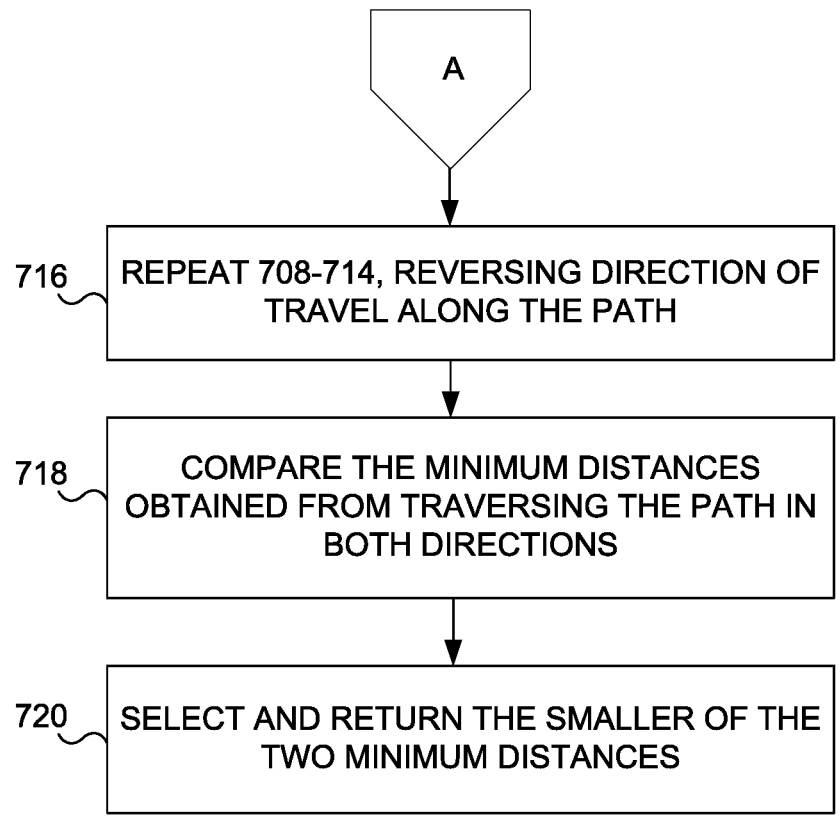
FIG. 7B depicts a second portion of a process of determining a minimum distance to travel from a given map node to achieve LOS to a potential spawn location, according to an implementation of the invention.

FIG. 7A depicts a first portion of a process 700 of determining a minimum distance to travel from a given map node to achieve LOS to a potential spawn location, according to an implementation of the invention. FIG. 7B depicts a second portion of process 700 of determining a minimum distance to travel from a given map node to achieve LOS to a potential spawn location, according to an implementation of the invention. Process 700 may be used to determine a minimum distance from a given map node to another map node (not limited to a potential spawn location) as well. As such, the various processing operations of FIGS. 7A and 7B will be described with respect to LOS between a spawn location and a map node for convenience and not limitation. The output of process 700 may be used as a value for the minimum distance to LOS in the LOS catalog for a given pair of map nodes, whether or not one or both nodes of the pair is a potential spawn point.

In an operation 702, LOS engine 202 may obtain a spawn location and map node for which to obtain a minimum travel distance to achieve LOS from the map node to the spawn location. For example, referring to FIGS. 4A, 4B, 4C, AND 4D, LOS engine 202 may perform a pairwise analysis for potential spawn location N1 and map node N5.

In an operation 704, LOS engine 202 may determine whether LOS exists from the map node to the spawn location. To accomplish the foregoing, LOS engine 202 may issue one or more line of site traces (e.g., using a min/max kd-tree, ray tracing techniques, Bresenham's line algorithm for two-dimensional games, etc.) starting from one map node to another map node and/or vice versa. For example, LOS engine 202 may issue one or more line of site traces from the map node to the spawn location. In some implementations, LOS engine 202 may account for elevation differences in a 3D game map when determining whether LOS exists from the map node to the spawn location. Referring to FIGS. 5A and 5B, for instance, LOS engine 202 may issue one or more line of site traces from each of various heights (H1, H2, H3 ... $H_N$) at a position P to a node N2 (or non-node position on a map). Position P may include a node (such as a node N1) or a non-node position on a map between nodes. In some instances, LOS engine 202 may issue one or more line of site traces from a given height at position P to more than one height of another node N2.

Each height (H1, H2, H3 ... $H_N$) may represent different player stances/positions. For example, a first height may represent a laid down position of the player, a second height may represent a crouched position of the player, a third height may represent a standing position of the player, and a fourth height may represent a highest jumping position of the player. Other heights may be used as well. For example, another height may represent a position of a player standing on a virtual object. In either example, an average player height may be used for the foregoing line of site traces.

In some implementations, if line of site traces from (or to) any one of the heights results in LOS, LOS engine 202 may determine that LOS exists from the position P to the spawn location. In some implementations, LOS engine 202 may analyze a line of site trace from (or to) a particular height separately from the other heights. For example, LOS engine 202 may determine whether line of site exists from the position P to the spawn location depending on whether line of site traces from (or to) any one of the first three heights (e.g., laid down, crouched, or standing position) results in LOS and depending on whether line of site exists from the map node to the spawn location depending on whether line of site traces from (or to) a fourth height (e.g., the jumping position). In a particular example, the jumping position (and/or other heights) may be separately weighted in making the determination of whether or not LOS exists from the position P to the spawn location. Such weights may be based on empirical observations, such as observations relating to the relative frequency that players are at different heights for a given position. For example, even if LOS is achieved at a jumping height but not at a standing height at a given position, this does not necessarily mean that an enemy player at the given position will be at the jumping height (e.g., an enemy player may be observed to usually be in a standing height rather than a jumping height at the given position). The foregoing types of observations may be map-specific because at a given position in the map, a player may tend to be at one height rather than another height (e.g., a given position on a map may require or otherwise be advantageous for a player to be either crouching, standing, jumping, etc.). Based on the frequency of heights that players are observed to be at a given position, the system or developer may apply different weights for those heights for that given position. In this manner, heights having less frequency of actual occurrence may be weighted lower than heights having a greater frequency of actual occurrence.

In implementations in which various heights are used to assess LOS (as illustrated in FIGS. 5A and 5B), the storage requirements for the LOS catalog may be given by equation (3) below.

$$\frac{N*(N+1)}{2} * M \text{ bytes,} \qquad (3)$$

wherein N=number of map nodes in a game map, and wherein M=number of bytes used to store height value sets.

For example, if two sets of heights (e.g., a jumping height and all other heights), then M would equal two.

It should be noted that LOS is not necessarily limited to a visual line of site in a two-dimensional or three-dimensional video game in which a player is able to visually see another player. For example, in two dimensional contexts (such as side-scrolling games, top-down games, etc.), even though a player may be able to visually see another player, LOS may not exist between the two players depending on the particular mechanics of that game. In particular, LOS may not exist between two players if a barrier between the players prevents some action (e.g., a player shooting another player) from occurring. In these instances, determining whether LOS exists may involve traversing a path between two nodes of the game (as described herein), but the line of sight traces may involve determining whether the action (such as shooting another player) is possible.

Responsive to a determination that LOS exists between the map node and the spawn location, in an operation 706, LOS engine 202 may store an indication that LOS exists between the map node and the spawn location. For example, LOS engine 202 may store a distance to LOS value of zero (to indicate no distance need be travelled to achieve LOS from the map node to the spawn location).

Responsive to a determination that LOS does not exist between the map node and the spawn location, in an operation 708, LOS engine 202 may identify and traverse a path (e.g., a shortest path 301A between N1 and N5 illustrated in FIGS. 4A and 4B, a path 401A illustrated in FIG. 4C, and/or a path 401B illustrated in FIG. 4D) between the spawn location and the map node. As will be described further, LOS engine 202 may traverse a given path in two directions (e.g., in a first direction indicated by arrows in FIG. 4A and a second, opposite, direction indicated by arrows in FIG. 4B). LOS engine may determine a minimum distance to achieve LOS between the map node and the spawn location for each direction, and identify the smaller of the two minimum distances, which may be used as the minimum distance to achieve LOS for the spawn location and map node pair.

LOS engine 202 may apply one or more conventional pathfinding algorithms (e.g., A*—commonly referred to as "A-Star") to identify the path. In some instances, the identified path is the shortest path between two nodes. Such a path may include intervening nodes (e.g., N2-N4 illustrated in FIGS. 4A and 4B), and/or non-node positions (e.g., positions indicated by distances traversed $d_{1-6}$ along a path 401A illustrated in FIG. 4C and a path 401B illustrated in FIG. 4D). LOS engine 202 may traverse a distance to a position along the path, which may include traversing to each intervening node in a given direction and/or traversing to various points along a path denoted by distance travelled $d_{1-6}$ illustrated in FIGS. 4C and 4D.

In an operation 710, when LOS engine 202 traverses to a position along the path (e.g., one of intervening nodes one of N2-N4 or a non-node position), it may determine whether LOS exists from the position to the potential spawn location (e.g., N1). Such a determination may be made in a manner similar to that described above with respect to operation 704. In some implementations, LOS engine 202 may traverse, from a position on the identified path, to a nearby node not on the identified path that is known to have LOS to the potential spawn location.

Responsive to a determination that LOS exists between the traversed-to position and the spawn location, in an operation 712, LOS engine 202 may record the distance travelled to the position, which represents the minimum distance to achieve LOS while traveling from the potential spawn location N1 to the other node N5 along path 301A in a first direction (denoted by arrows in FIG. 4A). LOS engine 202 may then proceed to operation 716 (illustrated in FIG. 7B), described below.

Responsive to a determination that LOS does not exist between the traversed-to position, and the spawn location, in an operation 714, LOS engine 202 may determine whether the other node has been reached. If yes, LOS engine 202 may return to operation 708, in which LOS engine 202 traverses to another distance to a next position along the path. If the other node has been reached, LOS engine 202 may proceed to operation 716 (illustrated in FIG. 7B).

In an operation 716, LOS engine 202 may repeat operations 708-714, but traversing path 301A or 401A in the opposite direction.

In an operation 718, LOS engine 202 may compare the minimum distances obtained from the first direction and the second direction. If no minimum distance was recorded for a given directional pass (meaning that there was no LOS in a position traversed between the pair of nodes along the direction traversed), then the distance travelled between the pair of nodes will be used as a minimum distance. Alternatively, a predefined maximum default value may be used as a minimum distance. For example, and without limitation, prior to a pathing operation, a minimum distance may be defaulted to the maximum default value, which is replaced when LOS is achieved. Alternatively, when no minimum distance is determined, then the maximum default value is selected.

In either instance, the minimum distance to achieve LOS may be stored as, without limitation, a single byte. In this example, the maximum default value may be quantized to be stored using the single byte. For example, the maximum default value (or the actual minimum distance to achieve LOS) may be quantized by dividing the distance by 10. In this example, the data may be initialized to 255 (implying a distance to line of sight of 2550 in distance units). When a minimum distance that is shorter than the maximum default value is found, the minimum distance will be used instead of the maximum default value.

In an operation 720, LOS engine 202 may select and return the smaller of the two minimum distances. Alternatively, LOS engine 202 may calculate an average the two smaller minimum distances and return the average.

In one non-limiting example, a minimum distance may be returned as a quantized value ranging from 0.0 to 1.0. For example, the minimum distance may be returned based on equation (4) below.

$$1 - \frac{d}{255}, \quad (4)$$

wherein d=distance units.

According to equation (4), a minimum distance value of 1.0 indicates instantaneous LOS exists (because distance units, d, is zero), while a minimum distance value of 0.0 indicates the distance is equal to the max distance of 2550 distance units (because, per the above, the maximum distance value of 2550 divided by 10 is 255). Other quantization values may be used as well.

In some implementations, referring to FIGS. 4C and 4D, LOS may be known to exist between a given map node N5 and another map node N2, which is not necessarily along a path between a pair of nodes (N1 and N5) being processed. If so, then LOS engine 202 may traverse a path 401B from one of the pair of nodes being analyzed (e.g., N1) to the map node (N2) having known LOS with the other of the pair of map nodes being analyzed (e.g., N5) and may periodically determine, at positions at various distances traversed (e.g., $d_5$ and $d_6$), whether LOS exists between the positions and the other map node (e.g., N5) using processing operations described herein with respect to FIGS. 5A and 5B. For example, LOS engine 202 may determine that LOS is first achieved at a position corresponding to a distance traveled ($d_6$) along path 401B. LOS engine 202 may determine that LOS is first achieved at a position corresponding to a distance traveled ($d_4$) along path 401A. In these instances, LOS engine 202 may compare the minimum distances to achieve LOS between N1 to N5 based on paths 401A and 401B to obtain the overall minimum distance to achieve LOS between N1 and N5. For example, LOS engine 202 may identify which one of $d_4$ and $d_6$ is smaller, and use the smaller value as the minimum distance to achieve LOS between the pair of map nodes N1 and N5.

In some implementations, for a given pair of nodes (e.g., N1 and N5) for which a minimum distance to achieve LOS between the pair has been determined (e.g., based on process 600 and/or process 700), LOS engine 202 may identify a set of one or more nodes (each of these nodes also being referred to as an $N_{LOS}$ node) having LOS to a first node (e.g., N1) of the pair. For each node in the set of $N_{LOS}$ nodes, LOS engine 202 may obtain a minimum distance ($D_{min}$) to LOS between the $N_{LOS}$ node and the second node of the pair (e.g., N5). $D_{min}$ may have been previously determined based on prior processing (e.g., via process 600 and/or process 700). If $D_{min}$ is smaller than the minimum distance to achieve LOS between N1 and N5, LOS engine 202 may determine a distance between N1 and the $N_{LOS}$ node (e.g., by determining the length of a 3D distance vector between N1 and the $N_{LOS}$ node). LOS engine 202 may sum the distance with $D_{min}$ and determine whether the sum is smaller than the minimum distance to achieve LOS between N1 and N5. If so, then LOS engine 202 may replace the minimum distance to achieve LOS between N1 and N5 with the sum. This is because, in the foregoing instance, a player may achieve LOS faster (e.g., smaller minimum distance) by traversing from node $N_1$ to $N_{LOS}$ than had the player traversed from N1 to N5 using the path used to obtain the previous minimum distance to achieve LOS (as determined based on process 600 and/or process 700). On the other hand, if the sum is greater than the minimum distance to achieve LOS between N1 and N5 that was previously determined (e.g., based on process 600 and/or process 700), then LOS engine 202 may not replace the minimum distance with the sum.

LOS engine 202 may repeat the foregoing for the other one (e.g., N5) of the pair of nodes (e.g., N1 and N5) and select the smaller of the two resulting values. LOS engine 202 may process a given pair of nodes using two or more passes of the foregoing process of using $N_{LOS}$ nodes to refine and update the LOS catalog as well. Furthermore, LOS engine 202 may repeat the foregoing for each pair of nodes for which minimum distance to achieve LOS between the pair has been determined (e.g., using process 600 and/or process 700).

It should be noted that all or a portion of process 600 and/or 700 may be repeated to account for any changes to a game map for which a LOS catalog has been generated. This may account for changes in map node locations, including any changes to spawn location locations, of the game map. For example, and without limitation, to the extent that the number of map node location changes for a given game map exceeds a predefined threshold value (e.g., one or more changes), an all-new LOS catalog may be generated for the changed game map. Otherwise, only portions of the LOS catalog affected by the changed map node locations may be updated. Furthermore, for updated game maps, changes to the LOS catalog may be stored as deltas that each indicate how the updated LOS catalog has changed relative to a previous version of the LOS catalog. In this sense, game maps and corresponding LOS catalogs, in some implementations, may be managed using version control techniques for storage and computational efficiency.

Revising LOS Catalogs Based on Empirical and/or Game Map Data

In an implementation, LOS modeling engine 204 may observe gameplay and record actual traversal times between map nodes. These traversal times may be used to determine weights for minimum distance to LOS. For example, even though a first sets of nodes may be spaced apart an equal distance as a second set of nodes, the first set of nodes may be more difficult to traverse (and therefore take longer to traverse) due to obstacles, tendency of players to congregate, and/or other factors. In these instances, the minimum distance until LOS is achieved for the first set of nodes may be weighted higher (e.g., have a distance weight>1), effectively increasing the minimum distance. Alternatively or additionally, the minimum distance until LOS is achieved for the second set of nodes may be weighted lower (e.g., have a distance weight<1), effectively decreasing the minimum distance.

Table 2 illustrates an exemplary LOS catalog having weighted minimum distances based on empirical and/or game map data, according to an implementation of the invention.

TABLE 2

| Potential Spawn location | Map Node | Minimum Distance until LOS achieved from Map Node to Spawn location | Distance Weight |
|---|---|---|---|
| N1 | N2 | 3 | 1.2 |
| N1 | N3 | 5 | 1.0 |
| N1 | N4 | 5 | 1.0 |
| N1 | N5 | 5 | 1.0 |
| N1 | ... | ... | ... |
| N1 | N18 | 4 | 1.0 |
| N2 | N3 | 3 | 1.0 |
| N2 | N4 | 3 | 1.0 |
| N2 | N5 | 3 | 0.9 |
| N2 | ... | ... | ... |
| N2 | N18 | 6 | 1.5 |

Identifying a Spawn Location for a Player Based on the LOS Catalog

In an implementation, game engine 122 may load a game map and its corresponding LOS catalog (either an unweighted version of the LOS catalog such as illustrated in Table 1 or weighted version of the LOS catalog such as illustrated in Table 2). Game engine 122 may process gameplay between one or more players. During gameplay, a player (whether a human player or an NPC player) may be killed, or otherwise require spawning.

Figure 8:
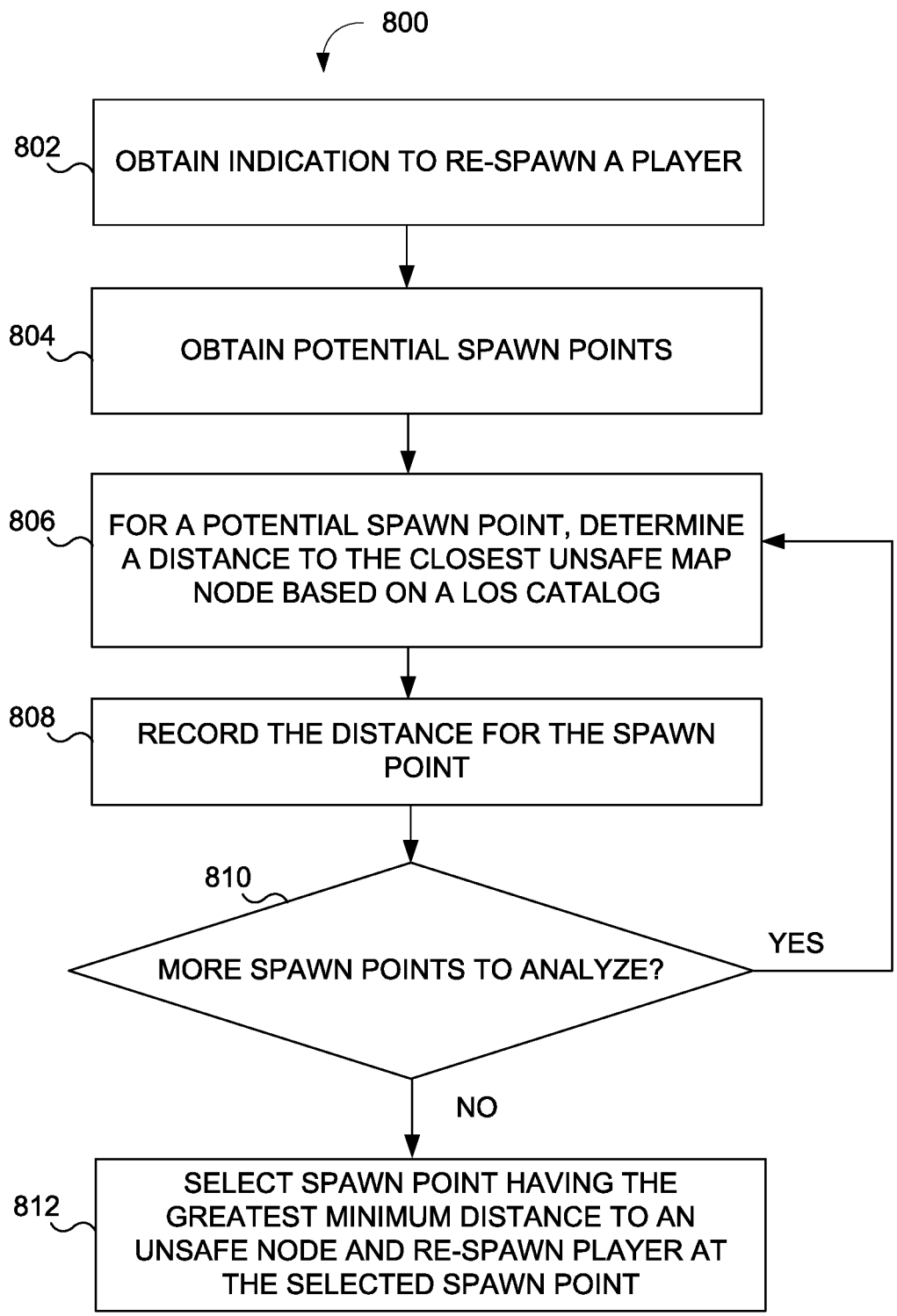
FIG. 8 depicts a process of identifying a spawn location, from among potential spawn locations on a game map, at which to spawn a player based on a distance to LOS catalog, according to an implementation of the invention.

FIG. 8 depicts a process 800 of identifying a spawn location, from among potential spawn locations on a game map, at which to spawn a player based on a distance to LOS catalog, according to an implementation of the invention.

In an operation 802, spawn engine 210 may obtain an indication to spawn the player. In an operation 804, spawn engine 210 may obtain an identification of potential spawn locations. The identification may be obtained from the LOS catalog or other source.

In an operation 806, spawn engine 210 may determine a distance from the closest unsafe map node to the spawn location. A map node may be considered "unsafe" if an unsafe game element that has LOS to the spawned player is currently located at the map node. The distance to an unsafe map node may be defined by a minimum distance to achieve LOS from the unsafe map node to the spawn location. The foregoing determination is further described below with respect to FIG. 9.

In an operation 808, spawn engine 210 may store the distance for the spawn location in a memory for later comparison to other distances for other spawn locations.

In an operation 810, spawn engine 210 may determine whether additional spawn locations are to be analyzed. Responsive to a determination that additional spawn locations are to be analyzed, spawn engine 210 may return to operation 806 to iterate through all potential spawn locations and store each of their respective distances.

Responsive to a determination that no additional spawn locations are to be analyzed, in an operation 812, spawn engine 210 may compare the distances for each of the spawn locations (e.g., previously stored in memory) and select a spawn location based on the comparison. For example, spawn engine 210 may select a spawn location having the greatest distance to an unsafe map node may be selected.

In some implementations, spawn engine 210 may select a spawn location based further on one or more other spawn factors. In other words, the greatest distance to an unsafe map node may be used as one of many factors. The other spawn factors may include, without limitation, a number of unsafe elements (e.g., number of enemy players, virtual grenades, automated virtual weapons, etc.) in nearby map nodes (e.g., a number of enemy players at the closest N map nodes, where N is an integer value greater than zero), a characteristic of an unsafe element (e.g., a type of weapon carried by an enemy player—where an enemy player carrying only a handgun may be less dangerous than an enemy carrying a rifle), and/or other factors.

In some implementations, the spawn factors may each be weighted and their corresponding weighted values may be cumulated to generate an overall score for each spawn location. Such weights may be pre-assigned by a game developer, user or others. Alternatively or additionally, the weights may be updated based on observations of the performance of players spawned at various spawn locations, and corresponding conditions around those spawn locations. For example, spawn engine 210 may observe that a high density of nearby enemy players contributes more so to kills of spawned players than does a type of weapon carried by an enemy player. Accordingly, the density of nearby enemy players may be weighted more heavily than a type of weapon carried by an enemy player. Likewise, spawn engine 210 may observe that a short distance to LOS contributes more so to kills of spawn players than other spawn factors.

Spawn engine 210 may quantify such importance based on observations of time before a spawned player is killed, a number of times spawned players are killed under certain spawn factor conditions, and/or other observed gameplay metric.

Figure 9:
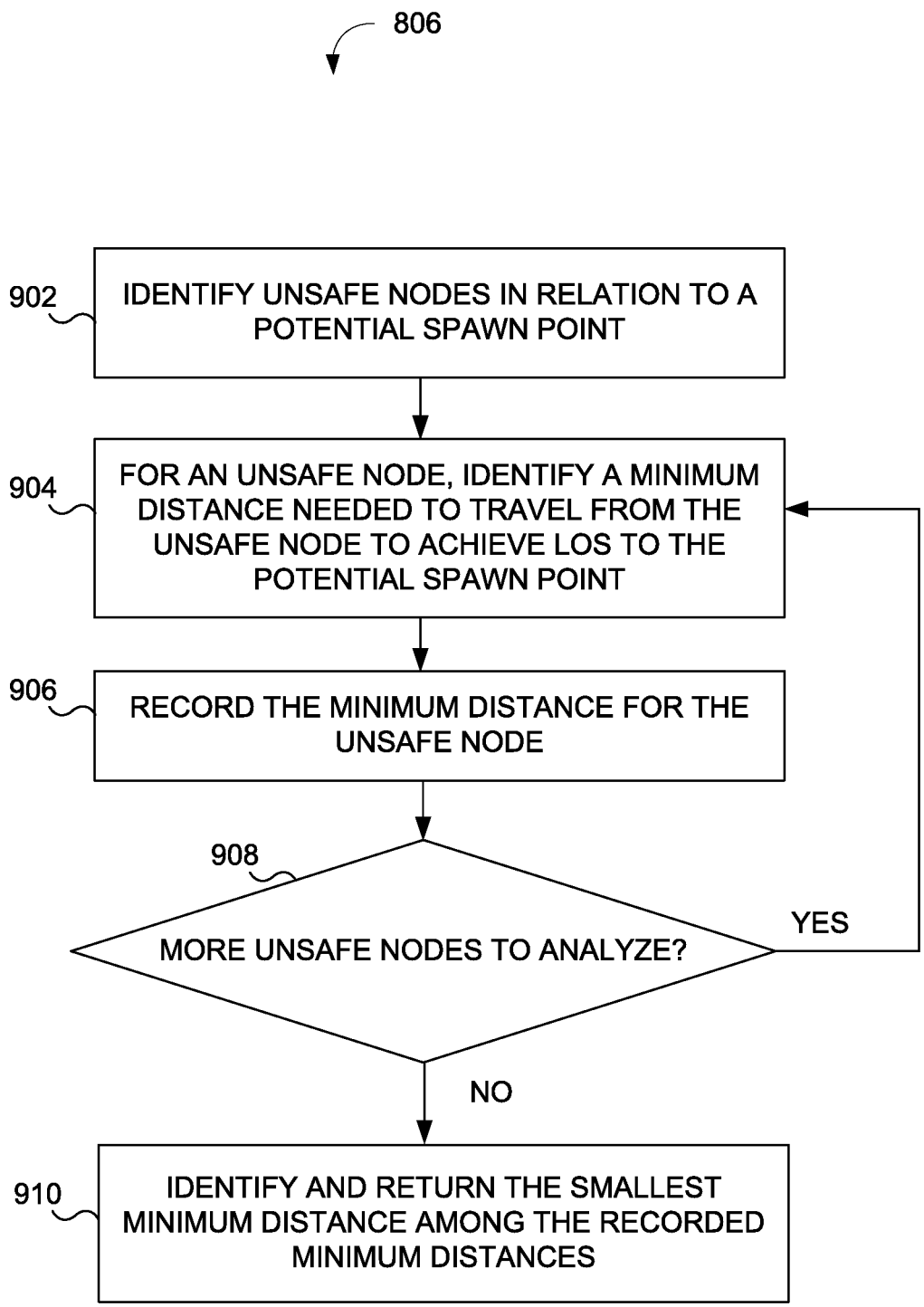
FIG. 9 depicts a process of identifying a closest unsafe map node to a spawn location based on a minimum distance to LOS catalog and location of unsafe game elements, according to an implementation of the invention.

FIG. 9 depicts a process 900 of identifying a closest unsafe map node to a spawn location based on a minimum distance to LOS catalog and location of unsafe game elements, according to an implementation of the invention. Process 900 may receive as input a spawn location (e.g., a map node identifier corresponding to a spawn location) from operation 806 illustrated in FIG. 8. As such, in some implementations, process 900 may be executed for each potential spawn location described with respect to FIG. 8.

In an operation 902, spawn engine 210 may identify unsafe map nodes. An unsafe map node may include a map node occupied by an unsafe game element. An unsafe game element may include a moving or stationary game element that can target a spawned player if LOS exists between the game element and a spawned player. An unsafe game element may include, without limitation, an enemy human or NPC player, an object (e.g., an automated weapon) that can target a spawned player, and/or other game element that can target a spawned player.

In an operation 904, spawn engine 210 may identify a minimum distance needed to travel from an unsafe map node to the spawn location. In an operation 906, spawn engine 210 may store the minimum distance for the unsafe map node.

In an operation 908, spawn engine 210 may determine whether more unsafe map nodes are to be processed. Responsive to a determination that more unsafe map nodes are to be processed, spawn engine 210 may return to operation 904.

Responsive to a determination that no more unsafe map nodes are to be processed, spawn engine 210 may identify and return the smallest minimum distance from among the distances identified and stored at operations 904 and 906. In this manner, process 900 may identify the closest unsafe map node to a given spawn location (e.g., smaller minimum distances to LOS may correspond to greater unsafety compare to greater minimum distances to LOS).

The various processing operations and/or data flows depicted in FIGS. 6, 7A, 7B, 8, and 9 may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

It should be noted that although LOS catalog is described in various examples as relating to LOS distance values for pairs of map nodes (whether or not a given map node of a given pair is a spawn point), the system may determine a distance to achieve LOS between other types of positions along a path, including non-node positions, as well. As such, an LOS catalog may include distances to achieve LOS between pairs of non-node positions, pairs of a non-node position and a map node, and/or other pair of positions for which a distance to achieve LOS between the pair may be determined and recorded. It is further noted that doing so, however, may increase the storage requirements of the LOS catalog and reduce the efficiency of the system.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims. As used herein throughout, the term "exemplary" is intended to convey "an example of."

What is claimed is:

1. A computer-implemented method of determining distances required to travel to achieve a line of site ("LOS") between pairs of map nodes of a game map for a video game, the method being implemented in a computer system having one or more physical processors programmed with computer program instructions that, when executed by the one or more physical processors, cause the computer system to perform the method, the method comprising:
    obtaining, by the computer system, a plurality of map nodes of the game map, the plurality of map nodes comprising at least a first map node and a second map node;
    identifying, by the computer system, a path between the first map node and the second map node;
    traversing, by the computer system, the path in at least a first direction from the first map node to the second map node;
    identifying, by the computer system, a first location along the path at which LOS is achieved between the first location and the second map node by issuing a first trace from the first location at a first height to the second map node, issuing a second trace from the first location at a second height, different than the first height, to the second map node, determining whether or not LOS exists from the first location to the second node based on the first trace or the second trace, wherein the first location is identified responsive to a determination that LOS exists from the first location;
    determining, by the computer system, a first distance traveled to the first location along the path; and
    generating, by the computer system, an entry in a LOS catalog using an identification of the first map node, an identification of the second map node, and a distance based on the first distance traveled.

2. The method of claim 1, wherein the first trace or second trace is issued using at least one of a minimum-maximum kd-tree technique, a ray tracing technique, or a Bresenham's line algorithm for two-dimensional games.

3. The method of claim 1, further comprising:
    traversing, by the computer system, the path in at least a second direction, different than the first direction, from the second map node to the first map node;
    identifying, by the computer system, a second location along the path at which LOS is achieved between the second location and the first map node;
    determining, by the computer system, a second distance traveled to the second location along the path; and
    identifying, by the computer system, a smaller one of the first distance and the second distance, wherein the distance based on the first distance equates to the smaller one of the first distance and the second distance.

4. The method of claim 1, further comprising:
    identifying, by the computer system, a third map node, not on the path, known to have LOS with the second location, wherein the third map node is also known to have a third distance to the second map node; and identifying, by the computer system, a smaller one of the first distance and the third distance, wherein the distance based on the first distance equates to the smaller one of the first distance and the third distance.

5. The method of claim 1, wherein traversing the path in at least the first direction further comprises:
traversing, by the computer system, from the first map node to a non-node position that is between the first map node and the second map node or an intermediary map node that is between the first map node and the second map node, wherein the first location comprises the non-node position or the intermediary map node.

6. The method of claim 1, wherein identifying the path further comprises:
identifying, by the computer system, a shortest path between the first map node and the second map node.

7. The method of claim 1, wherein the plurality of map nodes comprises a fourth map node, the method further comprising:
identifying, by the computer system, a second path between the first map node and the fourth map node;
traversing, by the computer system, the second path in at least a third direction from the first map node to the fourth map node;
identifying, by the computer system, a second location along the path at which LOS is achieved between the second location and the fourth map node;
determining, by the computer system, a second distance traveled to the second location along the second path; and
generating, by the computer system, a second entry in the LOS catalog using the identification of the first map node, an identification of the fourth map node, and a third distance based on the second distance traveled.

8. The method of claim 7, wherein the plurality of map nodes comprises a fifth map node, the method further comprising:
identifying, by the computer system, a third path between the fourth map node and the fifth map node;
traversing, by the computer system, the third path in at least a fourth direction from the fourth map node to the fifth map node;
identifying, by the computer system, a third location along the path at which LOS is achieved between the fourth location and the fifth map node;
determining, by the computer system, a third distance traveled to the third location along the third path; and
generating, by the computer system, a third entry in the LOS catalog using the identification of the fourth map node, an identification of the fifth map node, and a fourth distance based on the third distance traveled.

9. The method of claim 1, wherein the entry in the LOS catalog is generated prior to initiation of a given video game session, the method further comprising:
obtaining, by the computer system, an indication that a player should be spawned during gameplay of the given video game session;
identifying, by the computer system, a spawn point for the player based on the LOS catalog; and
causing, by the computer system, the player to be spawned at the spawn point during the given video game session.

10. The method of claim 9, wherein identifying the spawn point for the player based on the LOS catalog further comprises:
identifying, by the computer system, a map node at which an unsafe game element is located; and
determining, by the computer system, a minimum distance until LOS is achieved between the map node and the spawn point, wherein the spawn point is identified based on the minimum distance.

11. The method of claim 9, wherein identifying the spawn point for the player based on the LOS catalog further comprises:
identifying, by the computer system, a second spawn point; and
determining, by the computer system, a second minimum distance until LOS is achieved between the map node and the second spawn point, wherein the spawn point is identified based on a determination that the minimum distance is greater than the second minimum distance.

12. The method of claim 1, further comprising:
identifying, by the computer system, a third map node having LOS with the first map node;
obtaining, by the computer system, a minimum distance to achieve LOS between the third map node and the second map node;
determining, by the computer system, that the minimum distance to achieve LOS between the third map node and the second map node is less than the distance;
obtaining, by the computer system, a second distance between the first map node and the third map node;
determining, by the computer system, a sum of: the second distance between the first map node and the third map node, and the minimum distance to achieve LOS between the third map node and the second map node;
determining, by the computer system, that the sum is less than the distance; and
replacing, by the computer system, for the entry in the LOS catalog, the distance with the sum responsive to the determination that the sum is less than the distance.

13. A system for determining distances required to travel to achieve line of site ("LOS") between at least a first node and a second node of a game map for a video game, and of generating a LOS catalog based on the distances, the system comprising:
one or more physical processors programmed with one or more computer program instructions which, when executed, cause the one or more physical processors to:
obtain at least the first map node and the second map node;
identify a path between the first map node and the second map node;
traverse the path in at least a first direction from the first map node to the second map node;
identify a first location along the path at which LOS is achieved between the first location and the second map node by issuing a first trace from the first location at a first height to the second map node, issuing a second trace from the first location at a second height, different than the first height, to the second map node, determining whether or not LOS exists from the first location to the second node based on the first trace or the second trace, wherein the first location is identified responsive to a determination that LOS exists from the first location;
determine a first distance traveled to the first location along the path; and
generate an entry in a LOS catalog using an identification of the first map node, an identification of the second map node, and a distance based on the first distance traveled.

14. The system of claim 13, wherein the first trace or second trace is issued using at least one of a minimum-maximum kd-tree technique, a ray tracing technique, or a Bresenham's line algorithm for two-dimensional games.

15. The system of claim 13, wherein the one or more physical processors are further caused to:
traverse the path in at least a second direction, different than the first direction, from the second map node to the first map node;
identify a second location along the path at which LOS is achieved between the second location and the first map node;
determine a second distance traveled to the second location along the path; and
identify a smaller one of the first distance and the second distance, wherein the distance based on the first distance comprises the smaller one of the first distance and the second distance.

16. The system of claim 13, wherein the one or more physical processors are further caused to:
identify a third map node, not on the path, known to have LOS with the second location, wherein the third map node is also known to have a third distance to the second map node; and identify a smaller one of the first distance and the third distance, wherein the distance based on the first distance comprises the smaller one of the first distance and the third distance.

17. The system of claim 13, wherein to traverse the path in at least the first direction, the one or more physical processors are further caused to:
traverse from the first map node to a non-node position that is between the first map node and the second map node or an intermediary map node that is between the first map node and the second map node, wherein the first location comprises the a non-node position or the intermediary map node.

18. The system of claim 13, wherein to identify the path, the one or more physical processors are further caused to: identify a shortest path between the first map node and the second map node.

19. A computer-implemented method of determining a spawn point for a player in a video game session, the method being implemented in a computer system having one or more physical processors programmed with computer program instructions that, when executed by the one or more physical processors, cause the computer system to perform the method, the method comprising:
obtaining, by the computer system, an indication that a player should be spawned during gameplay of the video game session;
identifying, by the computer system, the spawn point for the player based on a line of site ("LOS") catalog by identifying a map node at which an unsafe game element is located and determining a minimum distance until a LOS is achieved between the map node and the spawn point, wherein the spawn point is identified based on the minimum distance; and
causing, by the computer system, the player to be spawned at the spawn point during the video game session, wherein at least a portion of the LOS catalog is generated prior to initiation of the video game session by obtaining at least a first map node and a second map node of a game map, identifying a path between the first map node and the second map node;
traversing the path in at least a first direction from the first map node to the second map node, identifying a first location along the path at which the LOS is achieved between the first location and the second map node, determining a first distance traveled to the first location along the path, and generating an entry in the catalog using an identification of the first map node, an identification of the second map node, and a distance based on the first distance traveled.

20. A computer-implemented method of determining a spawn point for a player in a video game session, the method being implemented in a computer system having one or more physical processors programmed with computer program instructions that, when executed by the one or more physical processors, cause the computer system to perform the method, the method comprising:
obtaining, by the computer system, an indication that a player should be spawned during gameplay of the video game session;
identifying, by the computer system, the spawn point for the player based on a line of site ("LOS") catalog by identifying a map node at which an unsafe game element is located, determining a minimum distance until a LOS is achieved between the map node and a first candidate spawn point, identifying a second candidate spawn point and determining a second minimum distance until LOS is achieved between the map node and the second candidate spawn point, wherein the spawn point is identified as the first candidate spawn point based on a determination that the minimum distance is greater than the second minimum distance; and
causing, by the computer system, the player to be spawned at the spawn point during the video game session, wherein at least a portion of the LOS catalog is generated prior to initiation of the video game session by obtaining at least a first map node and a second map node of a game map, identifying a path between the first map node and the second map node;
traversing the path in at least a first direction from the first map node to the second map node, identifying a first location along the path at which the LOS is achieved between the first location and the second map node, determining a first distance traveled to the first location along the path, and generating an entry in the_LOS catalog using an identification of the first map node, an identification of the second map node, and a distance based on the first distance traveled.

* * * * *